(12) United States Patent
Lee et al.

(10) Patent No.: US 8,323,489 B2
(45) Date of Patent: Dec. 4, 2012

(54) VESSEL AND METHOD FOR TREATING CONTAMINATED WATER

(75) Inventors: Douglas W. Lee, Calgary (CA); George Muir, Calgary (CA)

(73) Assignee: GLR Solutions Ltd., Calgary, Alberta (CA)

( * ) Notice: Subject to any disclaimer, the term of this patent is extended or adjusted under 35 U.S.C. 154(b) by 0 days.

(21) Appl. No.: 13/271,562

(22) Filed: Oct. 12, 2011

(65) Prior Publication Data

US 2012/0025407 A1 Feb. 2, 2012

Related U.S. Application Data

(62) Division of application No. 11/284,012, filed on Nov. 22, 2005, now Pat. No. 8,080,158.

(51) Int. Cl.
*C02F 1/24* (2006.01)
(52) U.S. Cl. ..................... 210/221.2; 210/205
(58) Field of Classification Search ............... 210/221.2, 210/205
See application file for complete search history.

(56) References Cited

U.S. PATENT DOCUMENTS

| | | | |
|---|---|---|---|
| 3,192,155 A * | 6/1965 | Bready et al. ................. | 210/705 |
| 3,932,282 A * | 1/1976 | Ettelt ......................... | 210/195.1 |
| 4,222,871 A * | 9/1980 | Lefeuvre ..................... | 210/636 |
| 4,231,867 A | 11/1980 | Sutphin | |
| 4,340,487 A * | 7/1982 | Lyon ........................... | 210/705 |
| 4,564,457 A | 1/1986 | Cairo, Jr. et al. | |
| 4,800,025 A | 1/1989 | Bibaeff | |
| 4,818,388 A | 4/1989 | Morioka et al. | |
| 5,080,802 A | 1/1992 | Cairo, Jr. et al. | |
| 5,158,678 A | 10/1992 | Broussard, Sr. | |
| 5,372,711 A | 12/1994 | Sill | |
| 5,543,043 A | 8/1996 | Bates et al. | |
| 5,558,678 A | 9/1996 | Weger | |
| 5,656,173 A | 8/1997 | Jordan et al. | |
| 5,766,484 A | 6/1998 | Petit et al. | |
| 5,900,154 A | 5/1999 | Henriksen | |
| 6,337,023 B1 | 1/2002 | Broussard, Sr. et al. | |
| 6,599,418 B2 * | 7/2003 | Wang ........................... | 210/202 |
| 6,896,816 B2 * | 5/2005 | Everton ........................ | 210/705 |
| 7,157,007 B2 | 1/2007 | Frankiewicz et al. | |
| 2004/0099607 A1 | 5/2004 | Leffler et al. | |
| 2007/0114183 A1 | 5/2007 | Lee et al. | |

FOREIGN PATENT DOCUMENTS

| | | |
|---|---|---|
| DE | 19618428 A1 | 11/1997 |
| DE | 19618428 A1 * | 11/1997 |
| DE | 19647512 A1 * | 5/1998 |
| DE | 19647512 A1 | 5/1998 |
| FR | 2591128 A1 | 6/1987 |

(Continued)

*Primary Examiner* — Thomas M Lithgow
(74) *Attorney, Agent, or Firm* — Harness, Dickey & Pierce, P.L.C.

(57) ABSTRACT

A method for removing immiscible fluid from contaminated water includes at least one chamber; an injection line in fluid communication with an inlet of the one chamber; bubble generation means in fluid communication with the injection line for injecting gas bubbles into the injection line and allowing mixing in the injection line of the gas bubbles and the contaminated water to form an inlet fluid; an inlet weir within the chamber adjacent the inlet; an immiscible fluid weir within the chamber; a trough for collecting the immiscible fluid and allowing the immiscible fluid to flow out of the at least one chamber through an immiscible fluid outlet; and a cleaned water outlet generally at the bottom of the chamber.

13 Claims, 32 Drawing Sheets

FOREIGN PATENT DOCUMENTS

| | | | |
|---|---|---|---|
| FR | 2591128 A1 * | 6/1987 |
| GB | 1411156 A | 10/1975 |
| JP | 48-082659 A * | 11/1973 |
| JP | 48082659 A | 11/1973 |
| JP | 55-049188 A * | 4/1980 |
| JP | 55049188 A | 4/1980 |
| WO | 9831634 A1 | 7/1998 |
| WO | WO98/31634 A1 * | 7/1998 |

* cited by examiner

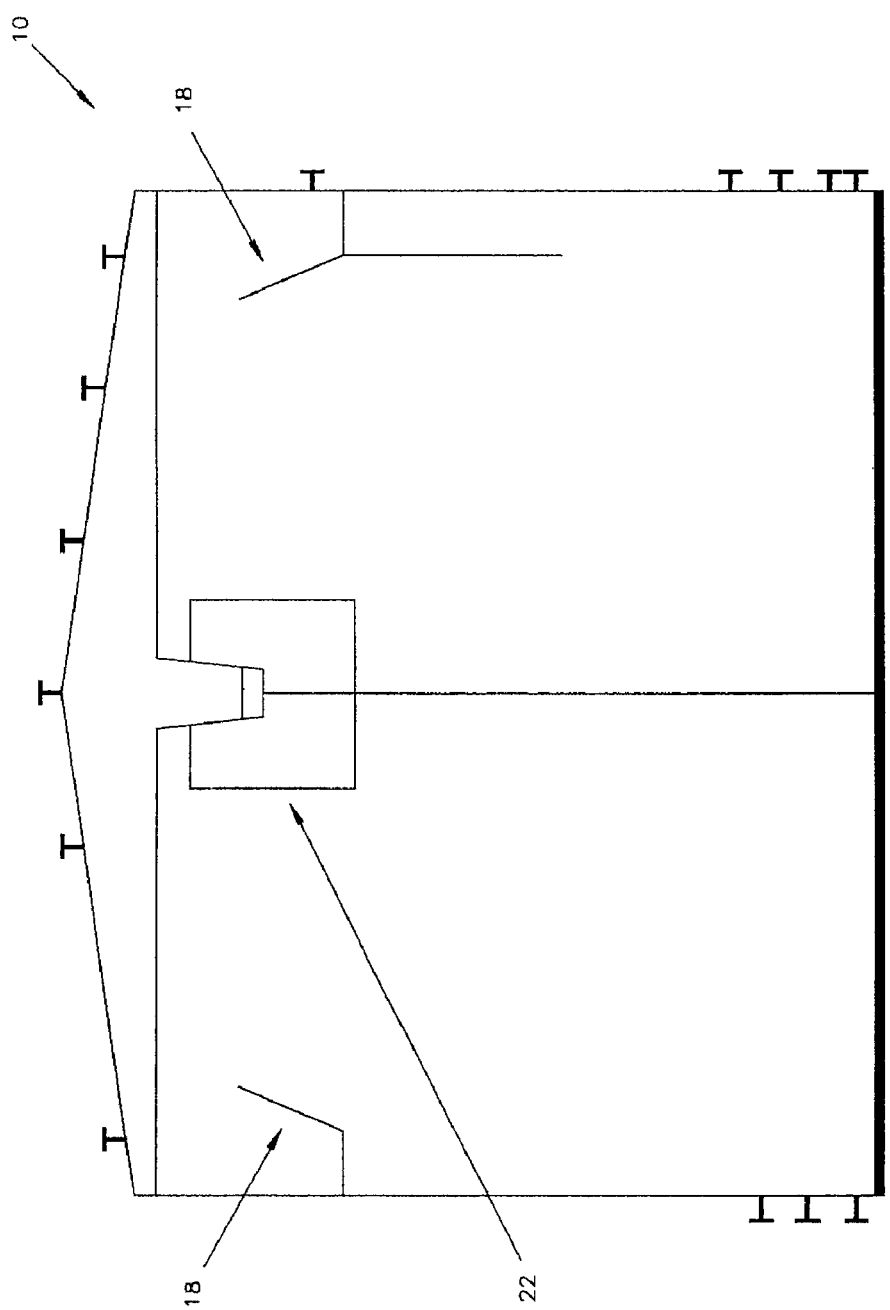

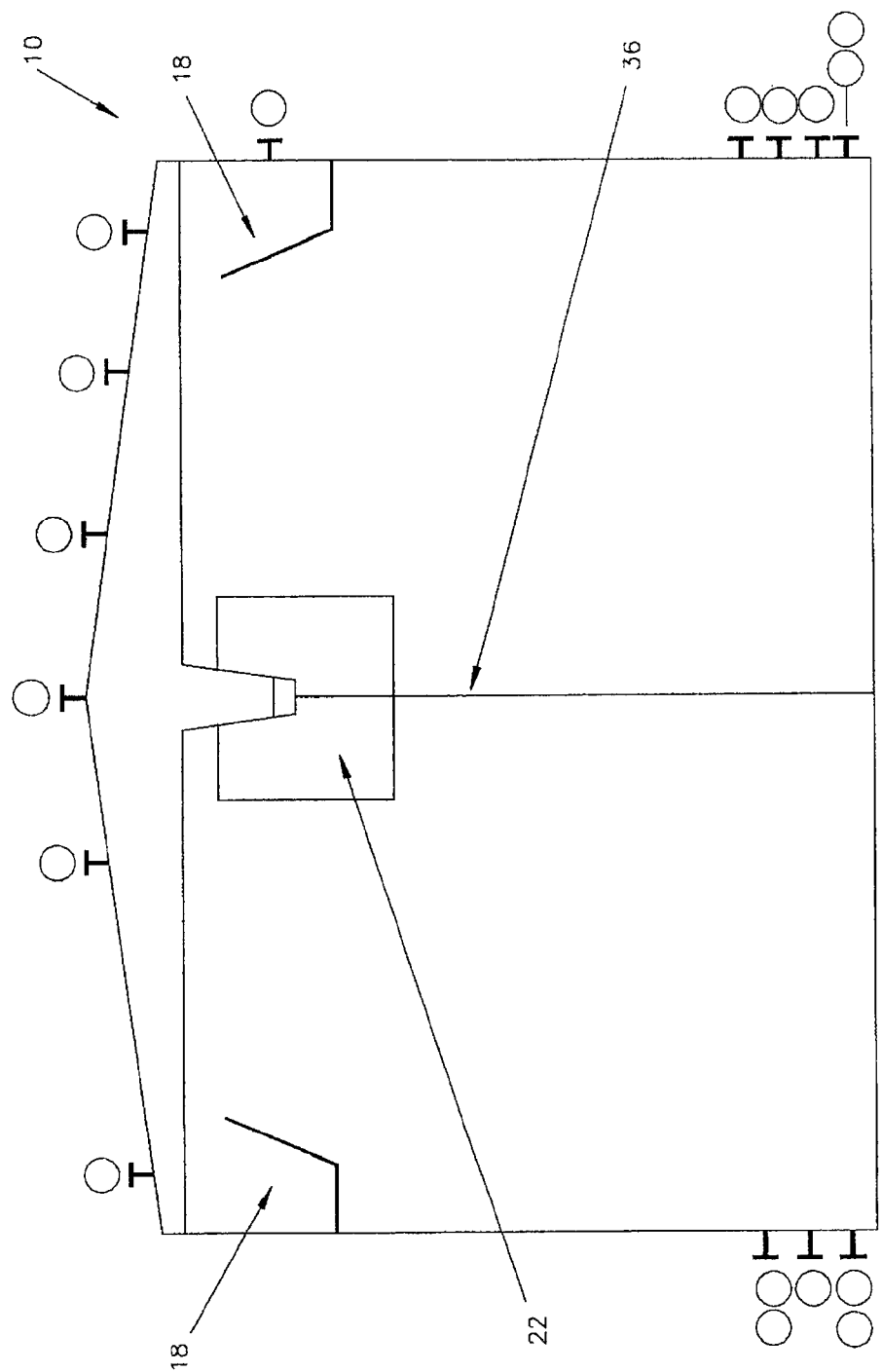

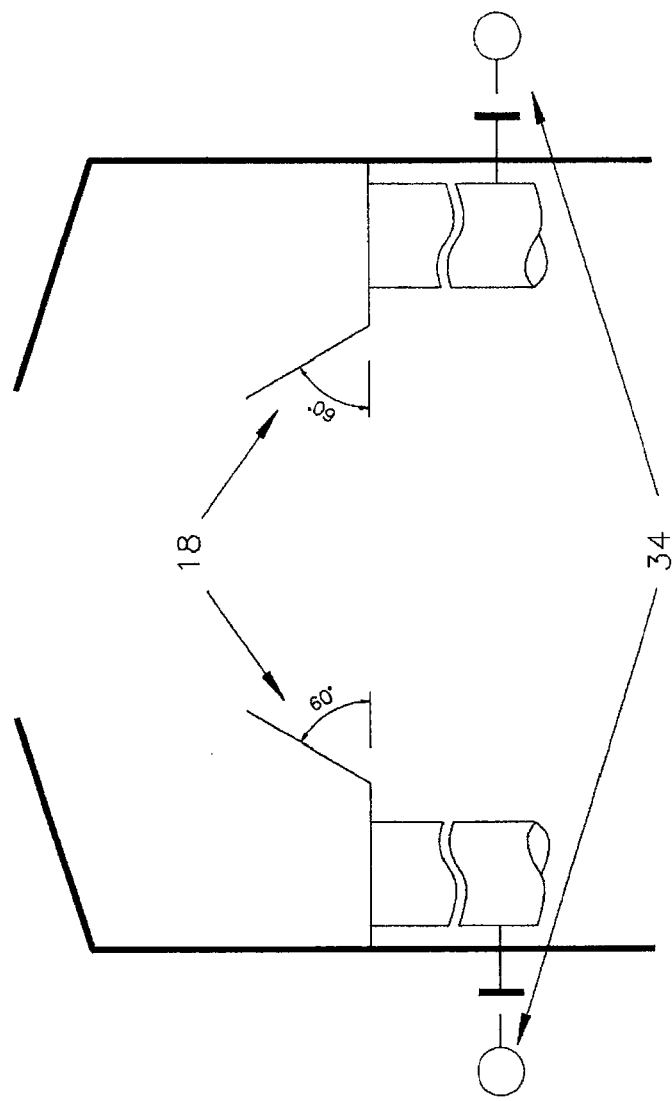
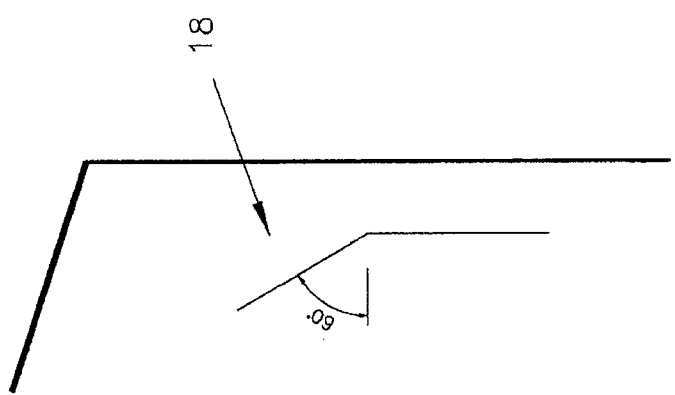
FIG. 9d

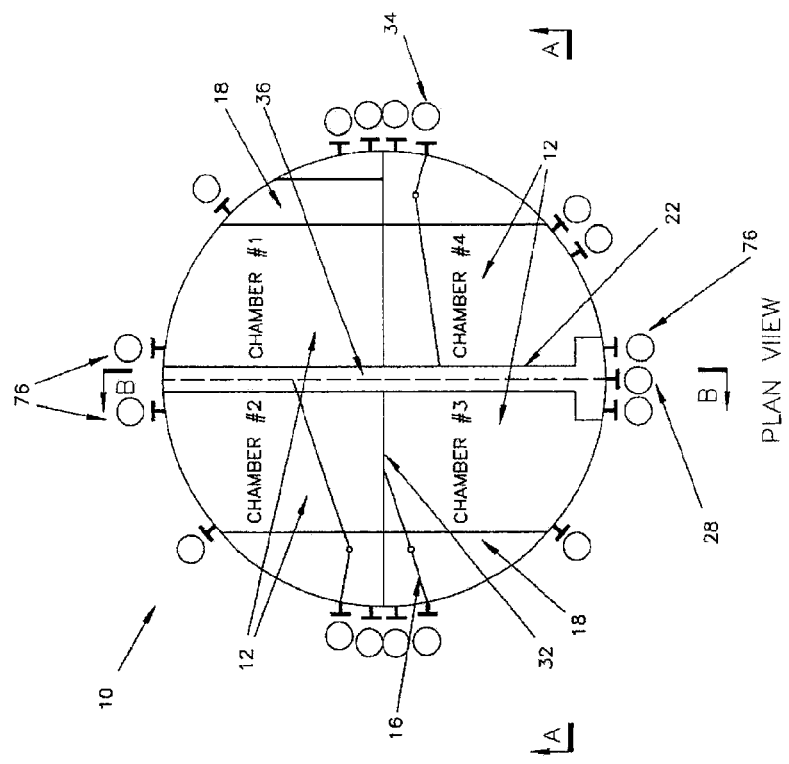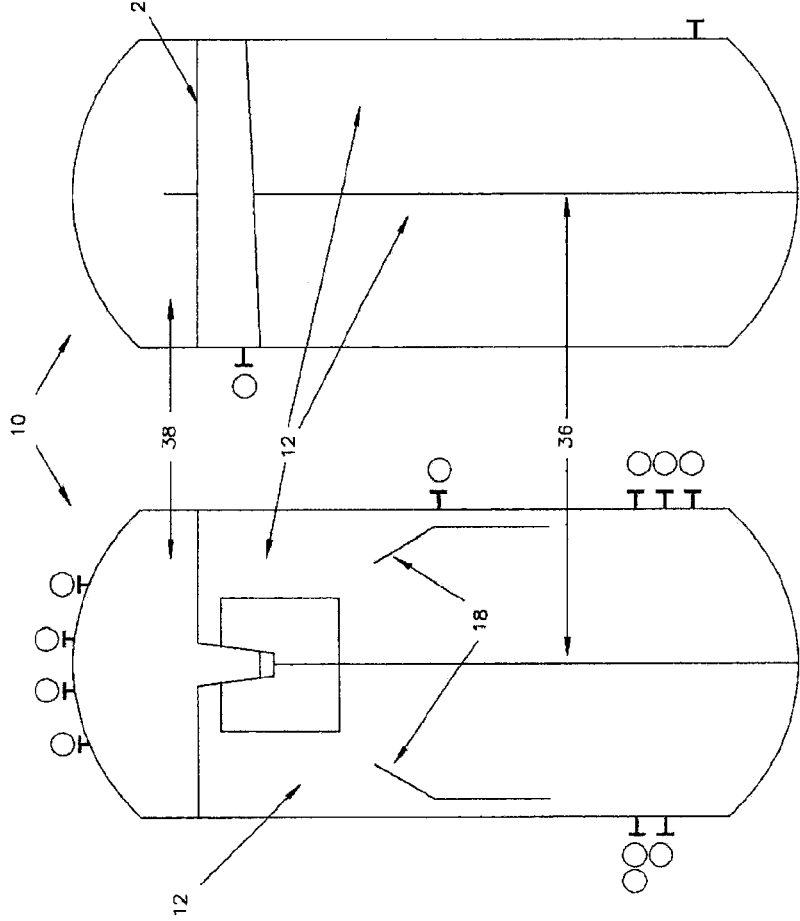
FIG. 10a

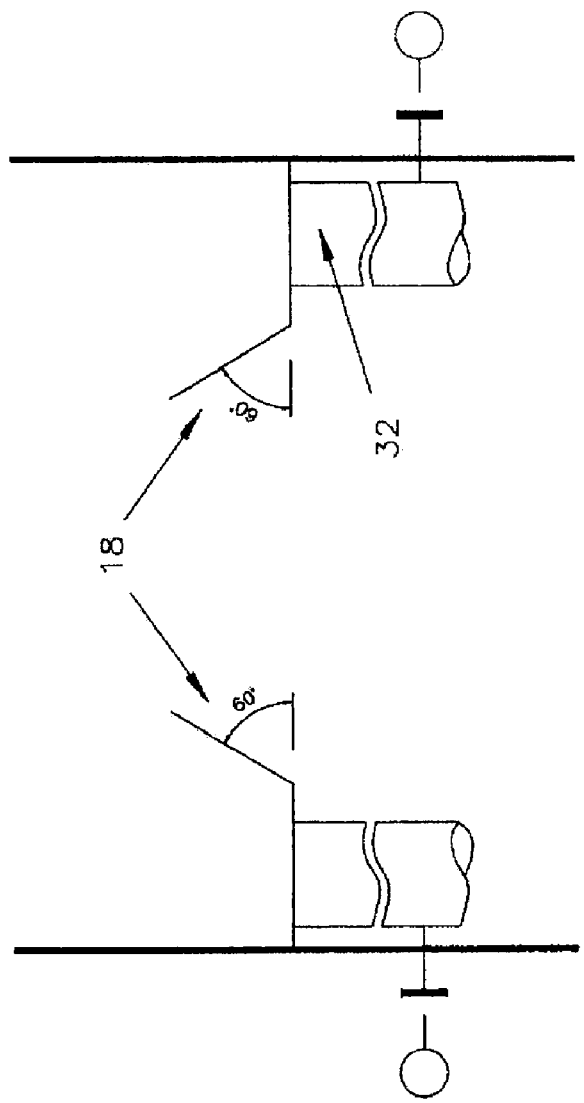
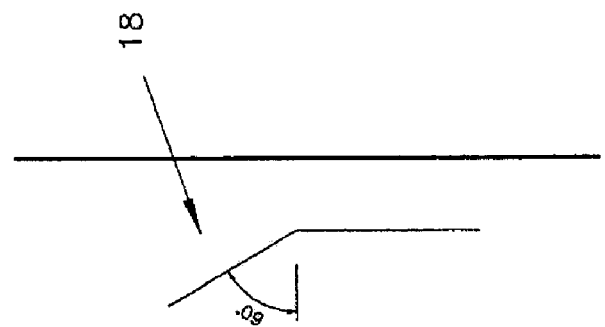
FIG. 10b

VESSEL AND METHOD FOR TREATING CONTAMINATED WATER

CROSS-REFERENCE TO RELATED APPLICATIONS

This application is a divisional of U.S. patent application Ser. No. 11/284,012 filed on Nov. 22, 2005. The entire disclosure of the above application is incorporated herein by reference.

FIELD

The present invention relates to water treatment vessels and methods of use, and more particularly to vessels used in treating water contaminated with immiscible fluids such as oil and bitumen.

BACKGROUND

This section provides background information related to the present disclosure which is not necessarily prior art.

Water produced by various commercial and industrial processes is often contaminated, particularly by oil and solid materials as is the case in the downstream petroleum industry, or may disadvantageously contain different component phases. Prior to discharge or re-use of this produced water, some form of treatment is generally required (either to re-use the produced water in subsequent process stages, or due to governmental regulation of discharge quality).

In the context of the petroleum industry, produced water can contain small oil droplets held in suspension. Various methods and apparatus have been proposed to enable the separation of the oil from the produced water, usually employing some form of flotation system.

One separation technology employed in the petroleum industry is the use of API and gravity separation tanks, such as a "skim tank". This technology is relatively simple and inexpensive, depending on the different densities of oil and water to enable gravity separation. Contaminated water is held in a vessel for a predetermined period of time, during which time the oil separates from the water and rises and collects at the vessel surface, allowing for skimming off of the oil. Parameters such as retention time, oil properties and inlet stream characteristics can be controlled to enhance separation, and tank dimensions are also of crucial importance. While such separators can be quite effective in removing larger oil droplets, however, they are generally ineffective in removing oil droplets of less than 50 microns (even if chemical treatments are added) and require substantial retention times.

Another well-known technology is the corrugated plate interceptor (CPI). In CPI vessels, corrugated plates are used to amplify the density differences by providing an inclined plate with a longer fluid travel path. With an inclined plate, individual oil droplets are presented with a shorter travel path to reach adjacent oil droplets, creating larger coalesced oil droplets which rise more quickly to the fluid surface. This allows for vessels with a much smaller footprint than with traditional gravity separation vessels, but it has the same limitation of being generally ineffective in removing oil droplets of less than 50 microns. In addition, chemical usage is increased and CPI vessels usually cope poorly with flow surges.

Induced gas flotation (IGF) vessels are also known in the industry, where gas is induced into the contaminated water (by means usually including eductors, sparging tubes and paddles) to more rapidly float the oil droplets out of the produced water. The oily froth is then skimmed off, sometimes by a baffle system. While IGF is one of the most prevalent technologies presently in use, it is still limited in terms of the oil droplet size that can be removed, and chemical treatment is therefore required. Also, the technology generally cannot be efficiently employed in retrofit situations.

Induced static flotation (ISF) technology is also known in the industry. This is another induced gas system, although it uses a different method of gas bubble generation than with IGF methods. In IGF systems, the bubbles are generated by mechanical means, while in ISF systems the bubbles are created by hydraulic methods. ISF vessels are usually separated into chambers, with gas introduction in each of the chambers, and ISF methods can be employed with a pressurized vessel. One limitation of ISF systems is that they have difficulty coping with oil concentrations above 300 ppm. In addition, such systems do not adequately address flow rate fluctuations, and retrofit capability is generally absent.

Hydrocyclones have also been used in the petroleum industry to treat contaminated produced water. These are conical tubes, and contaminated water is tangentially introduced into the upper end. The fluid spins around the tube, creating a centrifugal force that forces oil upwards and out of the tube while allowing the cleaned water to drain downwards. However, hydrocyclones are used in groupings based on flow rate, and the system cannot cope well with flow rate changes and the resultant fluid velocity shift. Also, there is a substantial pressure drop across the system, and a separate system is required to remove any solids in the produced water. Solids blockages can also be a problem, and the solids themselves can result in significant wear of the tube interior.

Finally, centrifuges have been used to treat produced water, with spinning forcing a separation of the oil and water. Unlike the hydrocyclones, centrifuges use moving parts to generate the spinning motion. While very effective in removing solids and enabling oil/water separation, the low flow rates and susceptibility to wear are problematic.

What is needed, therefore, is a water treatment vessel and method that does not require a substantial retention period, that can remove oil droplets less than 50 microns in diameter, and that can handle flow rate fluctuations. In addition, it would be advantageous to provide a vessel with a relatively small footprint, and the ability to handle solids as well as oil concentrations of greater than 300 ppm. Reducing the need for moving parts and chemical treatments, while allowing for retrofit of existing tanks, would also be desirable.

SUMMARY

This section provides a general summary of the disclosure, and is not a comprehensive disclosure of its full scope or all of its features.

According to a first aspect of the present invention there is provided a water treatment vessel for removing immiscible fluid from contaminated water to produce cleaned water, the vessel comprising: at least one chamber; an injection line in fluid communication with an inlet of the at least one chamber, the injection line for containing and transmitting the contaminated water from a source; bubble generation means in fluid communication with the injection line for injecting gas bubbles into the injection line and allowing mixing in the injection line of the gas bubbles and the contaminated water to form an inlet fluid; an inlet weir supported within the at least one chamber by first mounting means adjacent the inlet; an immiscible fluid weir supported within the at least one chamber by second mounting means, spaced from the inlet weir; a trough for collecting the immiscible fluid and allowing the immiscible fluid to flow out of the at least one chamber through an immiscible fluid outlet; and a cleaned water outlet generally at the bottom of the at least one chamber; wherein when the inlet fluid is injected into the at least one chamber, it passes through the inlet and over the inlet weir, the cleaned water flows downwardly toward the cleaned water outlet, and a remaining mixture of the immiscible fluid and the gas bubbles floats through the chamber to pass over the immiscible fluid weir and down the trough to the immiscible fluid outlet.

In exemplary embodiments of water treatment vessels according to the present invention, the immiscible fluid is oil or bitumen, and the water treatment vessel is substantially cylindrical, although it may also be rectangular, as discussed below. The water treatment vessel may be disposable in either a horizontal or vertical orientation. When disposed in a horizontal orientation, the first mounting means comprises a direct mounting of the inlet weir on a first interior surface of the at least one chamber adjacent the inlet, and the second mounting means comprises a direct mounting of the immiscible fluid weir on a second interior surface of the at least one chamber spaced from the inlet weir. When disposed in a vertical orientation, the inlet weir is centrally disposed within the at least one chamber, the immiscible fluid weir is circumferentially disposed about the inner surface of the at least one chamber, and the immiscible fluid weir is spaced from and disposed generally above the inlet weir.

The water treatment vessel preferably comprises at least two chambers (most preferably substantially of equal volume), the at least two chambers in fluid communication by means of at least one connecting pipe, the at least one connecting pipe for allowing the cleaned water to pass from the bottom of a first of the at least two chambers to a point adjacent the inlet weir of an adjacent second of the at least two chambers, the cleaned water outlet generally at the bottom of a last of the at least two chambers. The vessel also preferably comprises gas bubble injection means in fluid communication with the at least one connecting pipe for selectively injecting gas bubbles at a location in the at least one connecting pipe spaced from the inlet weir of the adjacent second of the at least two chambers, the gas bubbles preferably being microbubbles (most preferably each being less than 50 microns in diameter) composed of a gas selected from the group consisting of air, hydrocarbon gas, and nitrogen. The two adjacent chambers of the at least two chambers are preferably separated by a substantially vertical wall for separating fluids contained in each of the two adjacent chambers, with the substantially vertical wall extending from a lower inner surface of the water treatment vessel toward but spaced from an upper inner surface of the water treatment vessel, for containing fluids in each of the two adjacent chambers while allowing gas exchange between the two adjacent chambers. The at least one connecting pipe preferably passes through the substantially vertical wall and enables fluid communication between the two adjacent chambers.

The inlet weir preferably comprises a base portion and a wall portion, the wall portion generally angled upwardly and outwardly from the base portion, for directing the inlet fluid upwardly and away from the inlet, and the immiscible fluid weir preferably comprises a base portion and a wall portion, the wall portion generally angled upwardly and outwardly from the base portion, for receiving the remaining mixture of the immiscible fluid and the gas bubbles.

The vessel also preferably comprises nozzle means on the inlet, and recycle flow means for redirecting at least a portion of the cleaned water from the cleaned water outlet to the bubble generation means (most preferably, the recycle flow means are for directing approximately half of the cleaned water from the cleaned water outlet to the bubble generation means). The vessel further preferably comprises flow control means on the cleaned water outlet to allow a steady state, for maintaining volume of fluid exiting the cleaned water outlet substantially equal to volume of the inlet fluid entering the water treatment vessel, and at least one globe valve for controlling gas bubble injection into the injection line.

The vessel preferably comprises weir adjustment means to enable height adjustment of the immiscible fluid weir to minimize clean water loss, as well as at least one observation port in the at least one chamber to enable height adjustment of the immiscible fluid weir. The weir adjustment means preferably comprise a threaded spindle extending through the water treatment vessel and sealed by a packing gland, rotation of the spindle causing height adjustment of the immiscible fluid weir. The immiscible fluid weir is preferably composed of polyvinylidene fluoride. The water treatment vessel is preferably provided with an aperture adjacent the immiscible fluid weir and a nozzle fitting housed within the aperture, the at least one observation port comprising a tempered glass viewing pane disposed between the nozzle fitting and a retention member, enabling visual inspection of the immiscible fluid weir. The vessel preferably further comprises observation port clearing means, which most preferably comprise a conduit for selectively injecting gas or water into the nozzle fitting.

The trough may be provided with at least one heating coil to aid in flow of the immiscible fluid therealong, and the immiscible fluid outlet is preferably in fluid communication with an immiscible fluid retention tank adjacent the water treatment vessel.

In some exemplary embodiments where the water treatment vessel is horizontally disposed, the vessel comprises five chambers in series, each chamber in fluid communication with adjacent chambers by means of at least one connecting pipe, the at least one connecting pipe for allowing the cleaned water to pass from the bottom of one of the first four chambers to a point adjacent the inlet weir of an adjacent one of the last four chambers, the cleaned water outlet generally at the bottom of a last of the five chambers. The at least one connecting pipe is preferably sized to minimize pressure drop across the chambers of the water treatment vessel. The trough preferably runs substantially along the length of the water treatment vessel and is sloped to encourage flow of the immiscible fluid toward the immiscible fluid outlet, with the immiscible fluid weir being disposed on the second interior surface substantially opposite from and generally above the inlet weir.

In exemplary embodiments where the water treatment vessel is vertically disposed, the inlet weir preferably comprises a base portion and a peripheral wall portion, the peripheral wall portion generally angled upwardly and outwardly from the base portion, for directing the inlet fluid upwardly and away from the inlet, the injection line extending across the at least one chamber to enter the inlet weir. The immiscible fluid weir preferably comprises a wall portion, the second mounting means comprising the wall portion being directly mounted on an interior surface of the water treatment vessel and generally angled upwardly and inwardly from the interior surface, and the first mounting means comprising the inlet weir being supported by the injection line. The first mounting means most preferably comprise the inlet weir being supported by at least one rib projecting from an inner surface of the water treatment vessel.

The water treatment vessel may be a pressure vessel, where someone skilled in the art would recognize the utility of such in a given context.

According to a second aspect of the present invention there is provided a method for removing immiscible fluid from contaminated water from a source, the method comprising the steps of:

(a) providing a water treatment vessel comprising at least one chamber, an inlet weir supported within the at least one chamber by first mounting means, and an immiscible fluid weir supported within the at least one chamber by second mounting means, spaced from the inlet weir;

(b) transmitting the contaminated water from the source toward the at least one chamber by means of an injection line;

(c) providing bubble generation means for generating bubbles;

(d) generating and injecting the bubbles into the injection line;

(e) allowing the bubbles and contaminated water to mix in the injection line to form an inlet fluid;

(f) injecting the inlet fluid into the at least one chamber at an inlet adjacent the inlet weir;

(g) allowing the inlet fluid to pass over the inlet weir;

(h) allowing cleaned water and a remaining mixture of immiscible fluid and gas bubbles to separate from each other;

(i) allowing the cleaned water to flow downwardly by gravity to a cleaned water outlet;

(j) draining off the cleaned water through the cleaned water outlet;

(k) allowing the remaining mixture of immiscible fluid and gas bubbles to float across the at least one chamber and over the immiscible fluid weir; and (l) allowing the immiscible fluid to collect in a trough within the at least one chamber and flow out an immiscible fluid outlet.

In exemplary embodiments of methods according to the present invention, the method further comprises a step after step (a) but before step (b) of providing the water treatment vessel with immiscible fluid weir height adjustment means; and a step before step (k) of adjusting the immiscible fluid weir height adjustment means to minimize cleaned water loss over the immiscible fluid weir. Preferred methods then preferably further comprise a step after step (a) but before step (b) of providing the water treatment vessel with at least one observation port; and a step before step (k) of observing fluid level in the at least one chamber by means of the at least one observation port, to enable adjusting the immiscible fluid weir height adjustment means to minimize cleaned water loss over the immiscible fluid weir. Where at least one observation is provided, the method preferably further comprises a step after step (a) but before step (b) of providing the water treatment vessel with observation port clearing means; and a step of injecting gas or water into the observation port to clear the observation port of any build-up.

In methods wherein the water treatment vessel is provided with at least two chambers, the at least two chambers in fluid communication by means of at least one connecting pipe, the method preferably further comprises the step after step (i) of allowing the cleaned water to pass from the bottom of a first of the at least two chambers to a point adjacent the inlet weir of an adjacent second of the at least two chambers by means of the at least one connecting pipe. The bubble generation means preferably generate microbubbles, which are preferably composed of a gas selected from the group consisting of air, hydrocarbon gas, and nitrogen.

In exemplary methods, the method preferably comprises a step after step (j) of redirecting at least a portion of the cleaned water from the cleaned water outlet to the bubble generation means. Most preferably, approximately half of the cleaned water from the cleaned water outlet is redirected to the bubble generation means.

In some preferred embodiments, the method further comprises a step of selectively injecting gas bubbles at a location in the at least one connecting pipe spaced from the inlet weir of the adjacent second of the at least two chambers. Most preferably, the method preferably further comprises a step of withholding gas bubble injection in the at least one connecting pipe leading into a last of the at least two chambers, thereby forming a calming zone.

In exemplary embodiments of methods according to the present invention, the method preferably comprises a step of providing the water treatment vessel with flow control means on the cleaned water outlet; and a step of using the flow control means to maintain volume of fluid exiting the cleaned water outlet substantially equal to volume of the inlet fluid entering the water treatment vessel, allowing for a steady state within the water treatment vessel. Preferred methods may further comprise: a step of disposing the water treatment vessel in a vertical orientation; a step of centrally disposing the inlet weir within the at least one chamber; and a step of circumferentially disposing the immiscible fluid weir about the inner surface of the at least one chamber, the immiscible fluid weir being spaced from and disposed generally above the inlet weir. In some preferred embodiments, the method further comprises a step after step (l) of collecting the immiscible fluid in an immiscible fluid retention tank.

According to a third aspect of the present invention there is provided a water treatment vessel for removing immiscible fluid from contaminated water to produce cleaned water, the vessel disposable in a horizontal orientation and comprising:

five chambers in series, each chamber in fluid communication with adjacent chambers by means of a connecting pipe having an inlet opening into a second of two adjacent chambers;

an injection line in fluid communication with an inlet of a first of the five chambers, the injection line for containing and transmitting the contaminated water from a source;

bubble generation means in fluid communication with the injection line for injecting gas microbubbles into the injection line and allowing mixing in the injection line of the gas microbubbles and the contaminated water to form an inlet fluid;

an inlet weir supported within each of the five chambers by a direct mounting on a first interior surface of the chamber adjacent the inlet of each chamber;

an immiscible fluid weir supported within each of the chambers by a direct mounting on a second interior surface of the chamber, spaced from the inlet weir;

a trough in communication with the immiscible fluid weir of each of the chambers for collecting the immiscible fluid and allowing the immiscible fluid to flow out of the chambers through an immiscible fluid outlet; and a cleaned water outlet generally at the bottom of a last of the five chambers;

wherein when the inlet fluid is injected into the first of the five chambers, the inlet fluid passes over the inlet weir, the cleaned water flows downwardly toward the bottom of the first of the five chambers and through the connecting pipe to a next adjacent chamber, the cleaned water flows sequentially through each of the chambers, and the cleaned water finally flows through the cleaned water outlet; and wherein a remaining mixture of the immiscible fluid and the gas microbubbles floats through each of the chambers to pass over the immiscible fluid weir and down the trough to the immiscible fluid outlet.

According to a fourth aspect of the present invention there is provided a water treatment vessel for removing immiscible fluid from contaminated water to produce cleaned water, the vessel disposable in a vertical orientation and comprising:

a chamber;

an injection line in fluid communication with an inlet of the chamber, the injection line for containing and transmitting the contaminated water from a source;

bubble generation means in fluid communication with the injection line for injecting gas microbubbles into the injection line and allowing mixing in the injection line of the gas microbubbles and the contaminated water to form an inlet fluid;

an inlet weir centrally disposed and supported within the chamber by first mounting means adjacent the inlet of the chamber;

an immiscible fluid weir circumferentially disposed about an inner surface of the chamber, spaced from and disposed generally above the inlet weir;

a trough in communication with the immiscible fluid weir for collecting the immiscible fluid and allowing the immiscible fluid to flow out of the chamber through an immiscible fluid outlet; and a cleaned water outlet generally at the bottom of the chamber;

wherein when the inlet fluid is injected into the chamber, the inlet fluid passes over the inlet weir, the cleaned water flows downwardly toward the bottom of the chamber and through the cleaned water outlet; and wherein a remaining mixture of the immiscible fluid and the gas microbubbles floats through the chamber to pass over the immiscible fluid weir and down the trough to the immiscible fluid outlet.

Vessels and methods according to the present invention can be used in conjunction with some known microbubble generation technologies. For example, Canadian Patent Application No. 2,460,123, assigned to the assignee of the present application, teaches an apparatus and method for producing microbubbles in liquids, for use in treating contaminated liquids. A vertical pipe receives a liquid-gas mixture having gas bubbles of relatively large diameter, and a series of horizontal apertures permit the pipe to expel the mixture radially outwardly from the pipe. In a refinement of the invention, a specific relationship is specified between the exit area of the apertures and the interior cross-sectional area of the pipe, in order to most suitably convert the gas bubbles in the mixture to microbubbles of a desired small size when expelled under pressure from the pipe. A method of converting gas bubbles in the mixture to gas microbubbles, and for exposing such gas microbubbles to material entrained in the mixture so as to permit the gas microbubbles to physically or chemically react with the materials, is further disclosed.

Water treatment vessels and methods according to the present invention can therefore provide numerous advantages over the prior art, including a shorter lead time than is the case with alternative technologies on the market, and the elimination of mechanical oil skimming apparatus/steps. In addition, the microbubble generation mechanism is external to the chamber(s), and there are no diffusers or eductors within the water treatment sections of the vessel where it can be difficult to clean and maintain components. A high degree of control over gas rates/ratios and bubble size is also possible, at a lower operating cost; vessels according to the present invention use no eductors, with the result that there is no pressure drop required, thereby saving significant operation costs when compared to known vessels. The use of eductors requires a fairly fixed motive flow across the vessel for operation, with little flexibility to allow an increase or decrease in gas ratios and no control over bubble size; using a vessel according to the present invention allows for operator control over gas flow rates and bubble size by valve adjustment at the pump.

The ability to make use of microbubble technology allows for smaller bubble size than with some known vessel technologies, resulting in higher separation efficiency, lower recirculation rates than other induced gas systems, removal of emulsified oil, and reduction (or elimination) of the need for additional chemicals to assist separation.

Accordingly, the present invention seeks to provide a water treatment vessel and method that requires a minimal retention period, removes oil droplets less than 50 microns in diameter, and can handle solids, flow rate fluctuations, and oil concentrations of greater than 300 ppm. Vessels according to the present invention can also be manufactured with a relatively small footprint, without any moving parts, and the technology can be used for retrofit of existing tanks.

A detailed description of exemplary embodiments of the present invention is given in the following. It is to be understood, however, that the invention is not to be construed as limited to these embodiments.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In the accompanying drawings, which illustrate exemplary embodiments of the present invention:

FIG. 1 is a simplified perspective view of a horizontally disposed water treatment vessel according to the present invention;

FIG. 2*a* is a cut-away top plan view of a horizontally disposed embodiment according to the present invention;

FIG. 2*b* is a cross-sectional view along line A-A of FIG. 2*a*;

FIG. 2*c* is a cross-sectional view along line B-B of FIG. 2*a*;

FIG. 2*d* is a cross-sectional view across a chamber of the embodiment of FIG. 2*a*;

FIG. 3*a* is a detail view of weir adjustment means;

FIG. 3*b* is a detail view of adjustable weirs;

Figure 8A:
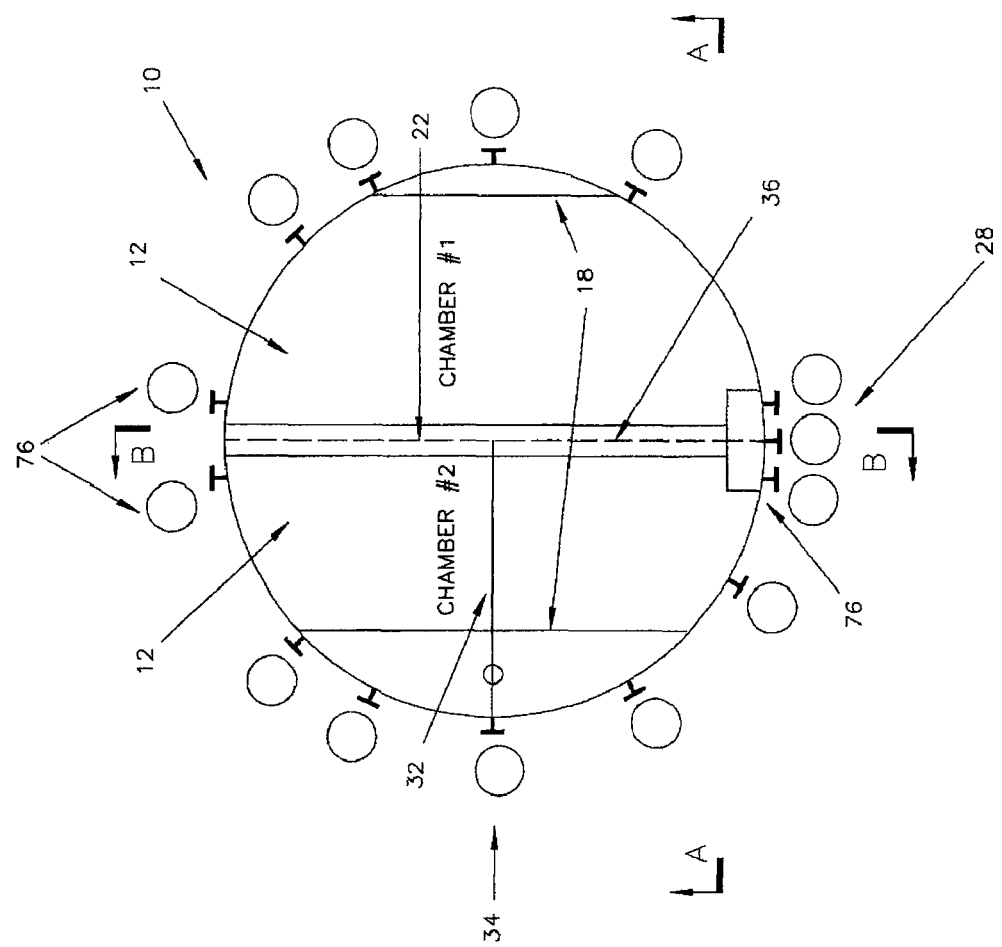
Figure 8C:
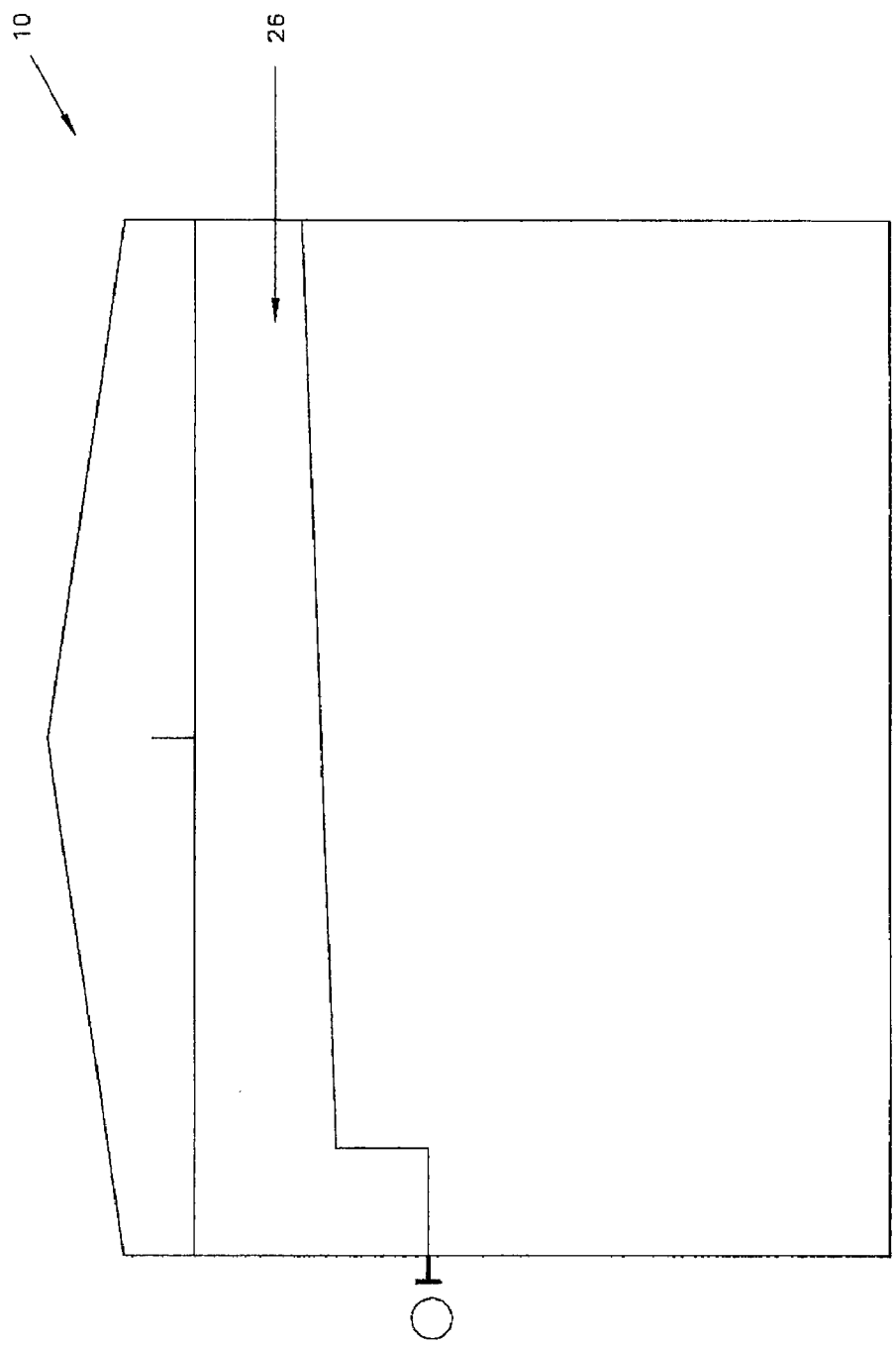
Figure 8D:
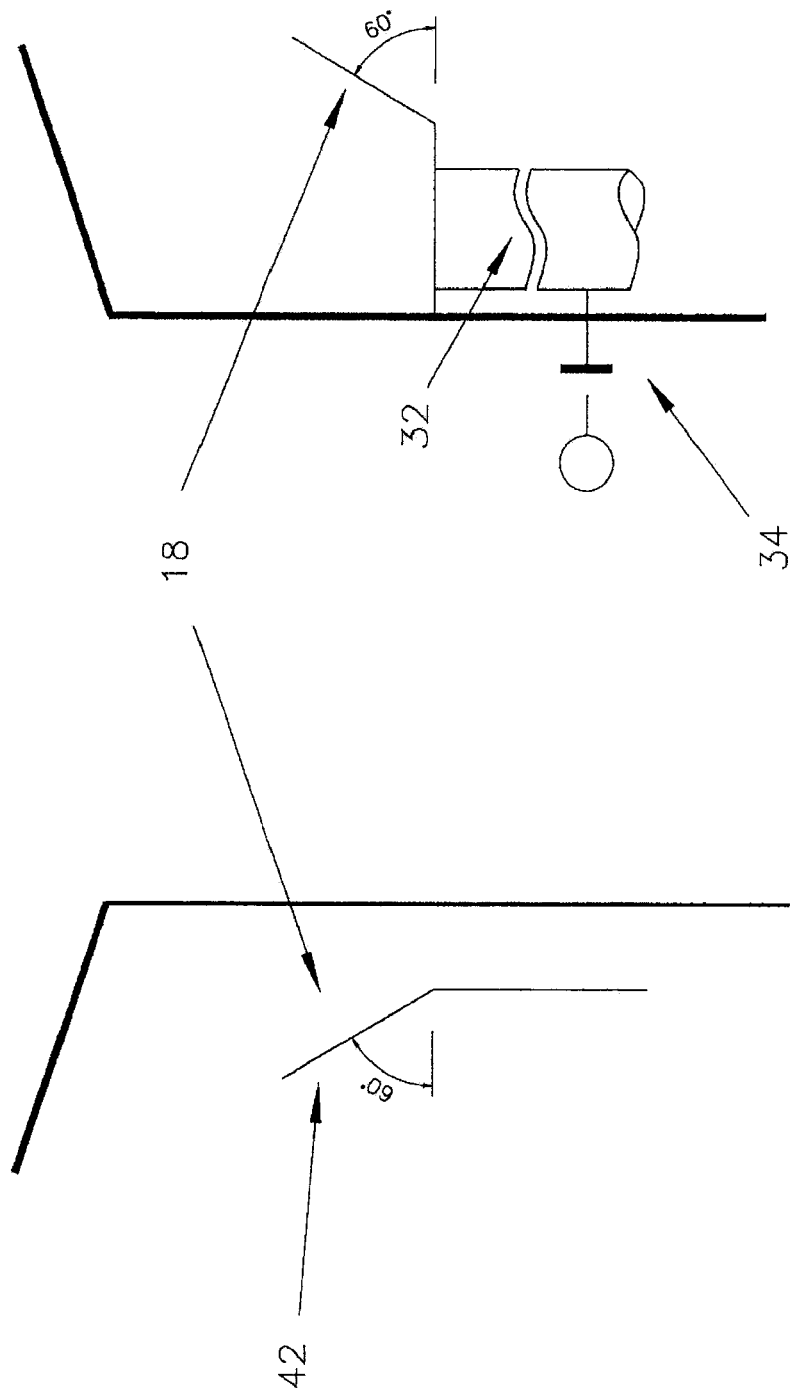
Figure 8E:
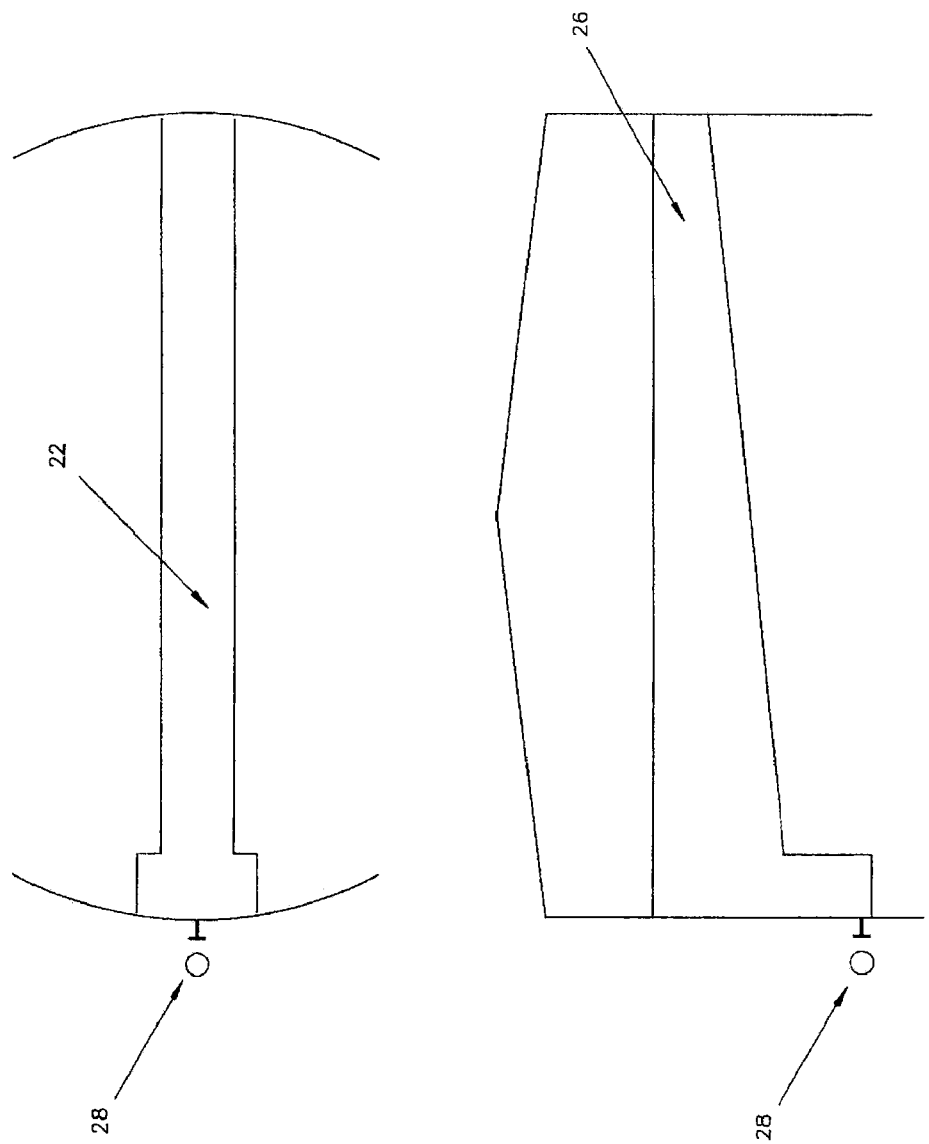
Figure 9A:
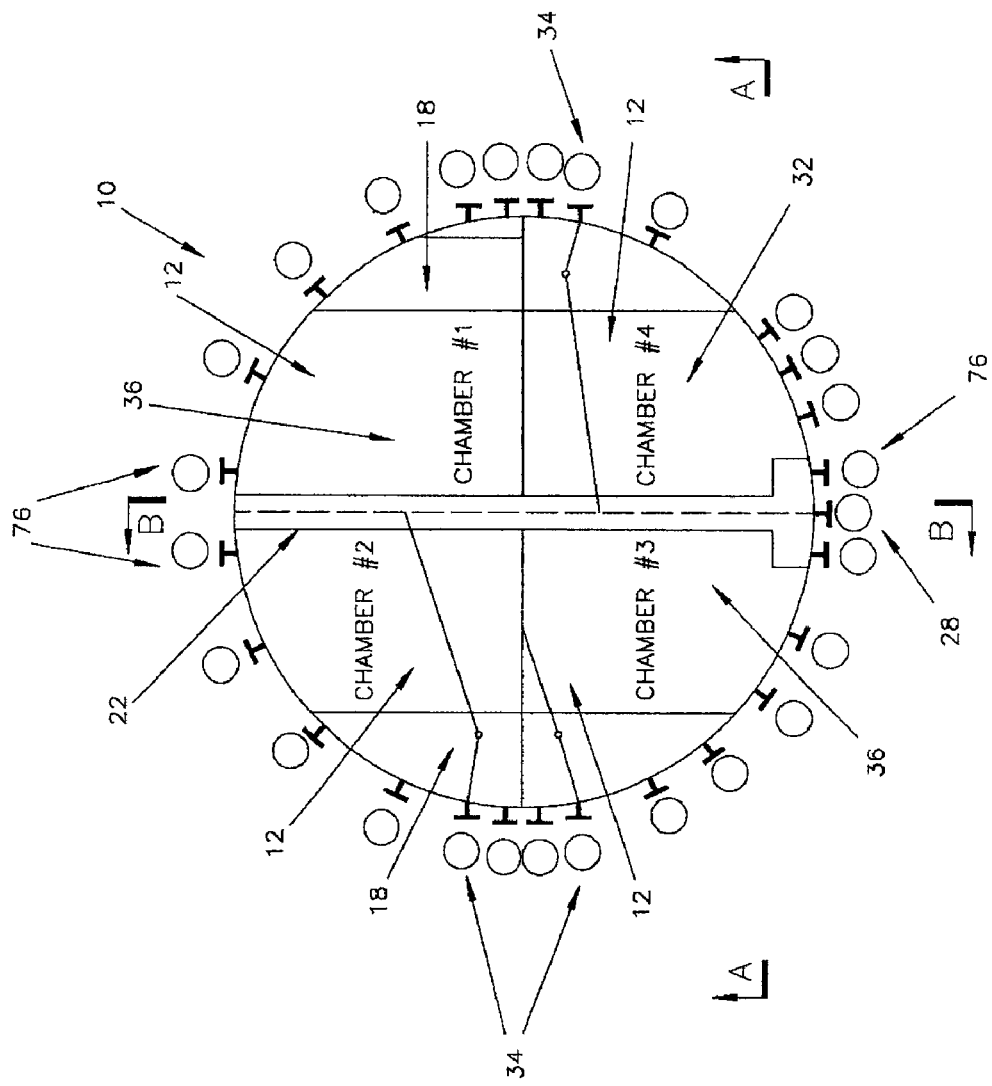
Figure 9C:
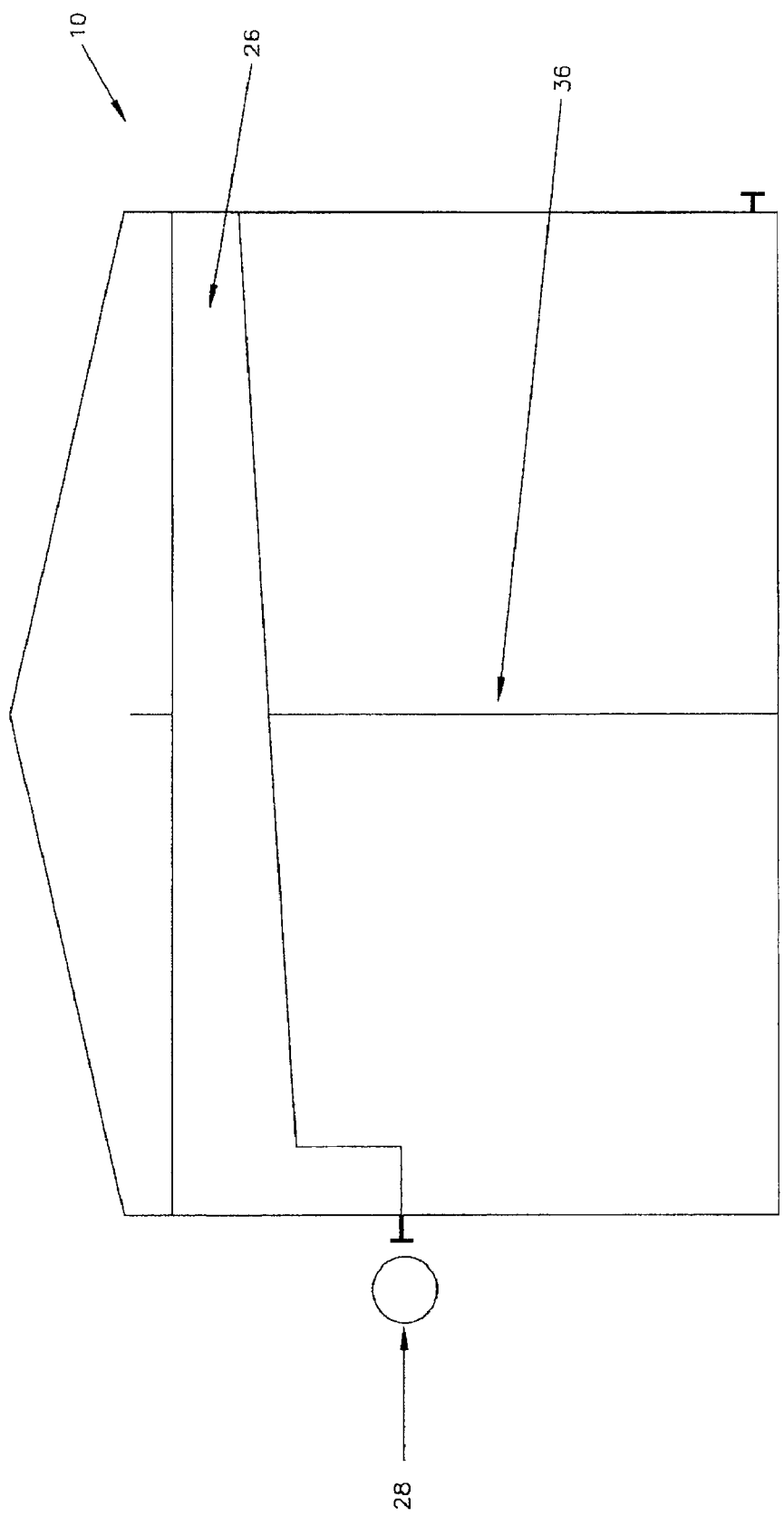
Figure 9E:
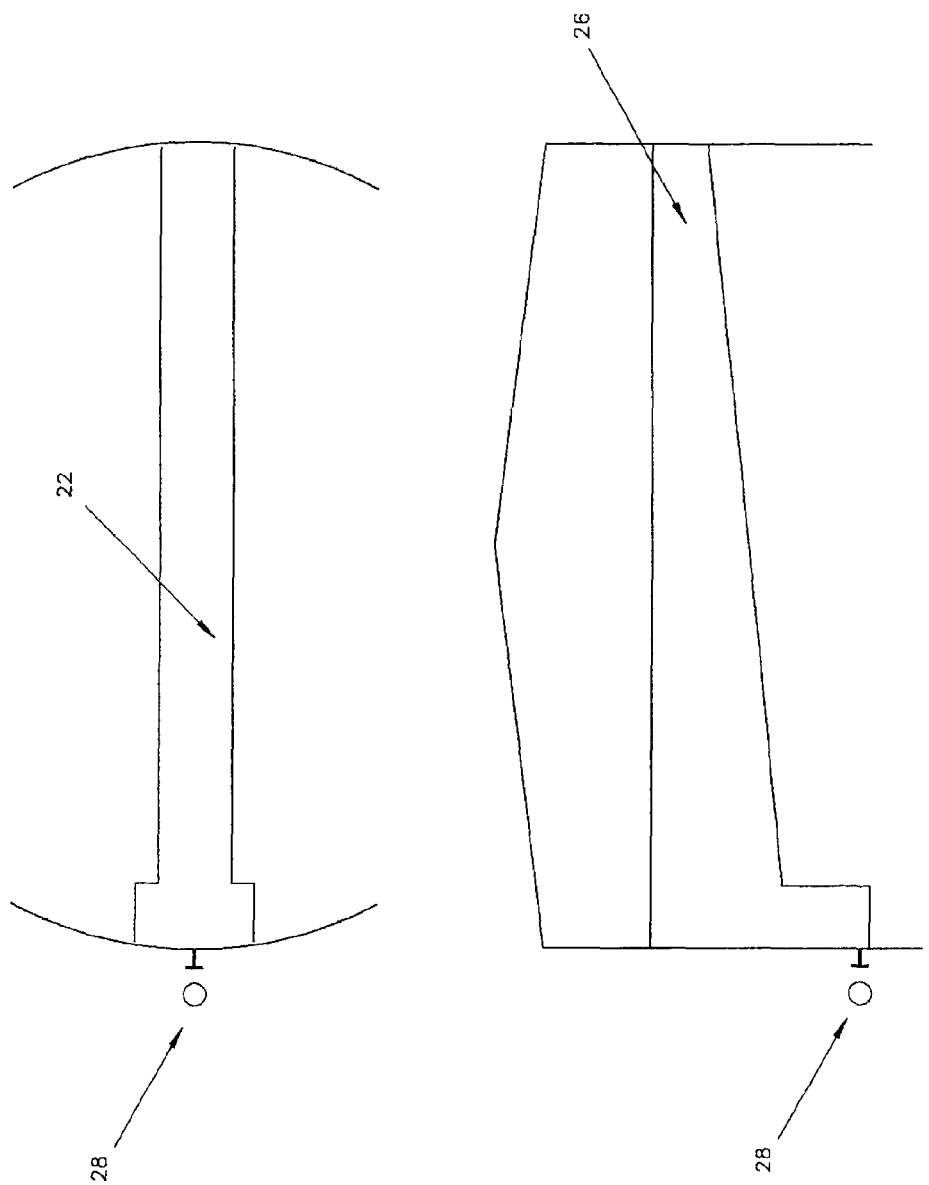
Figure 10C:
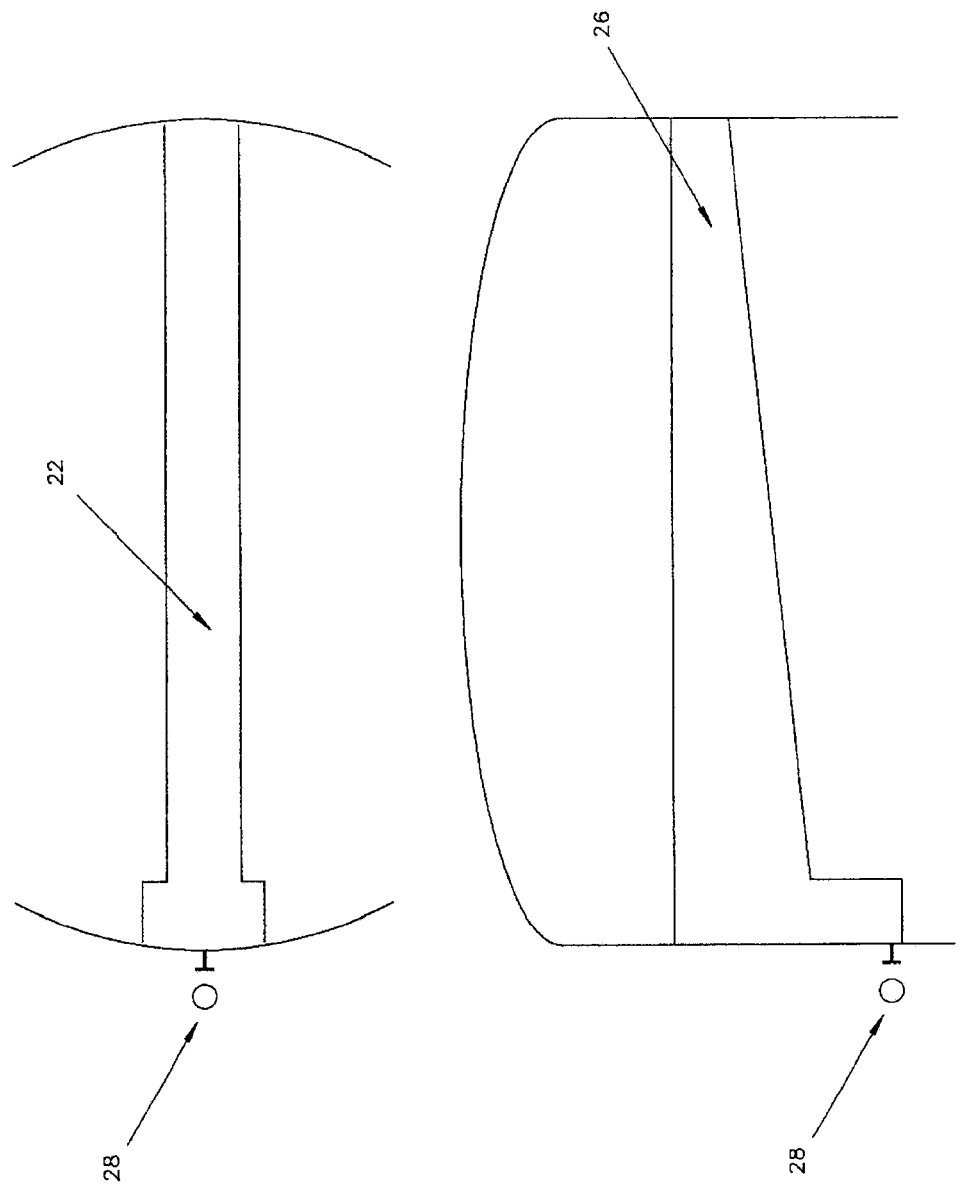
Figure 11:
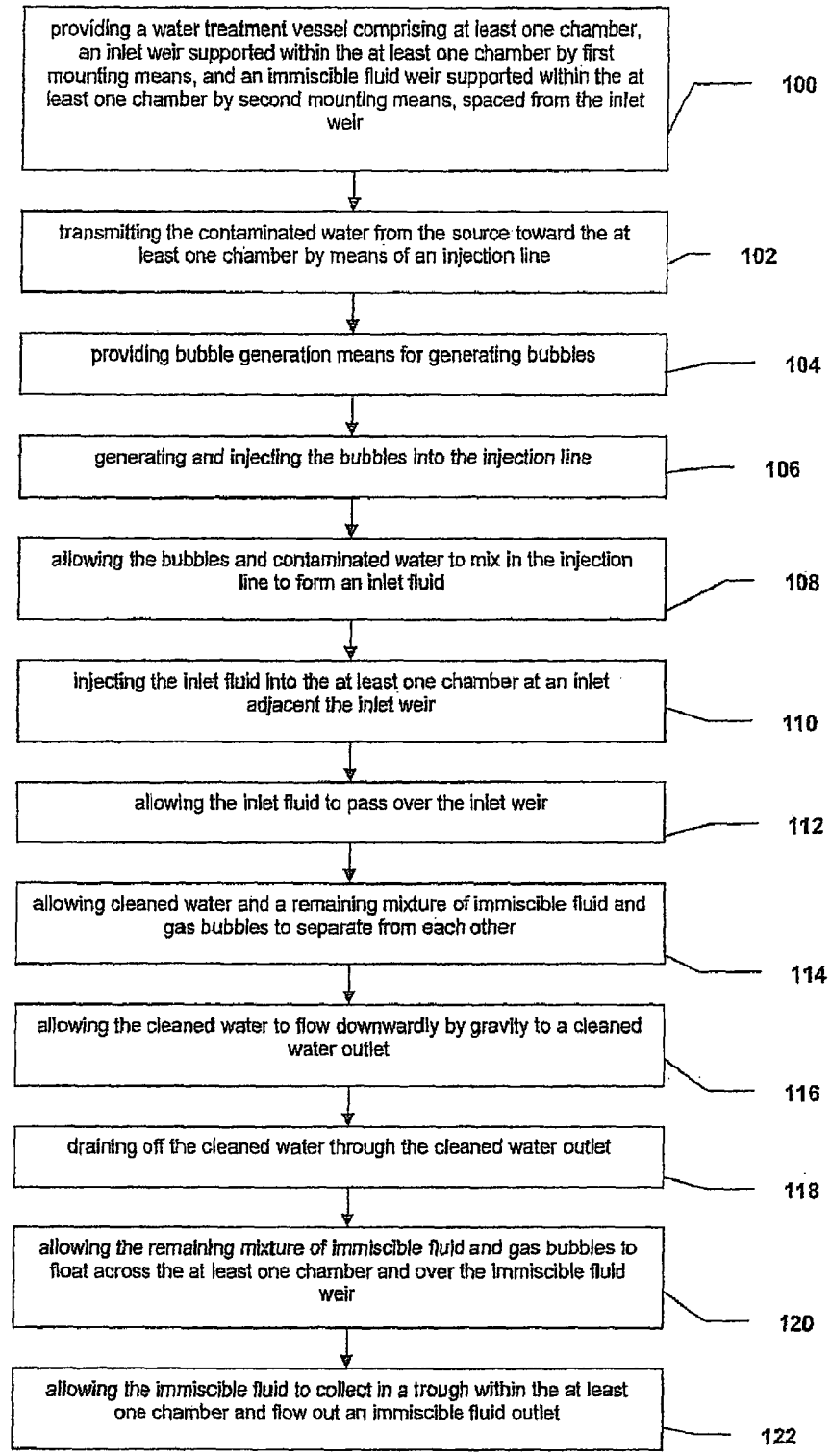
Figure 12:
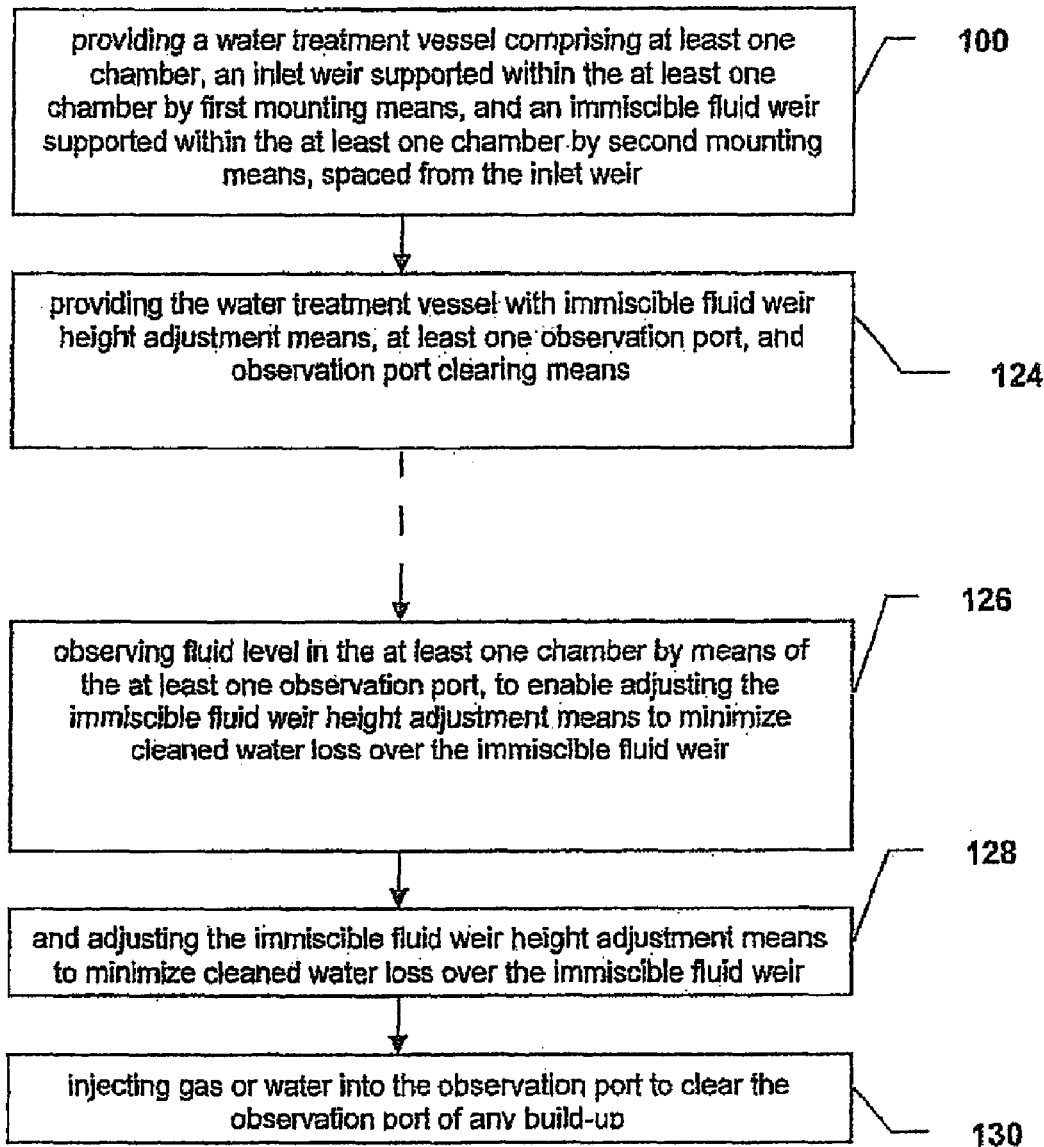
Figure 13:
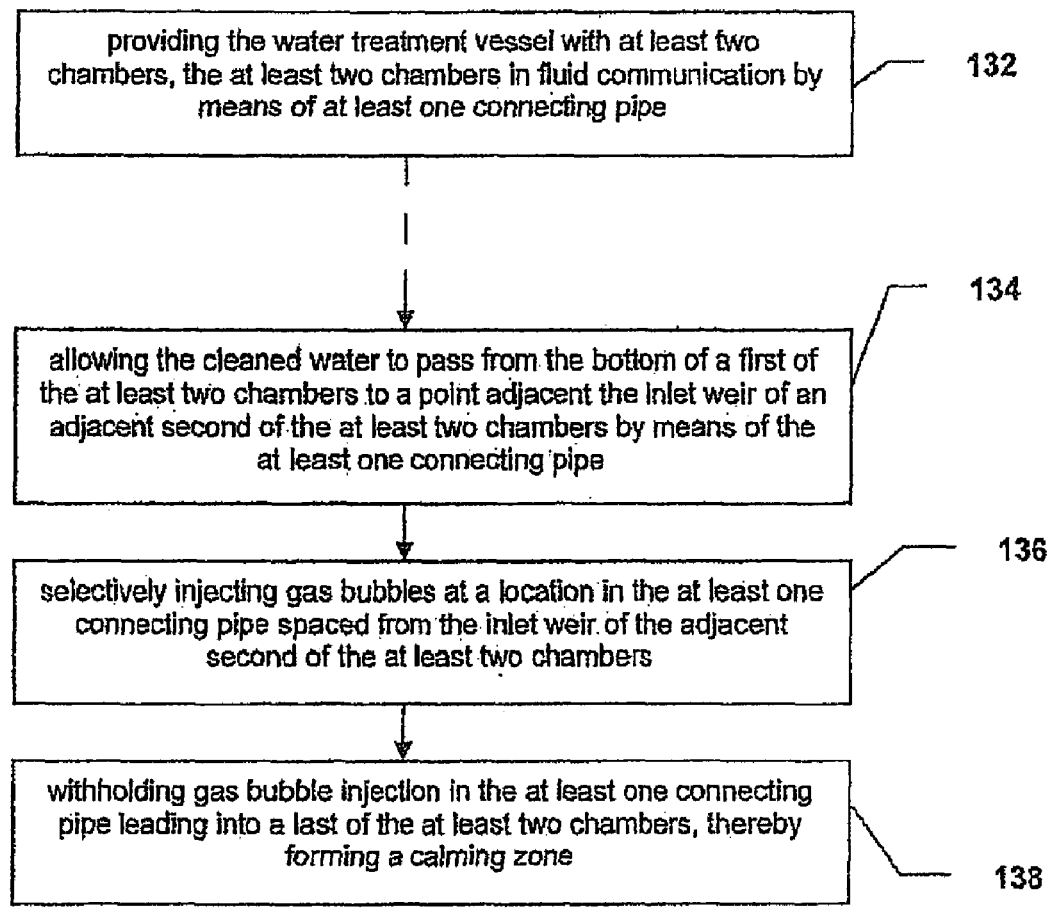
Figure 14:
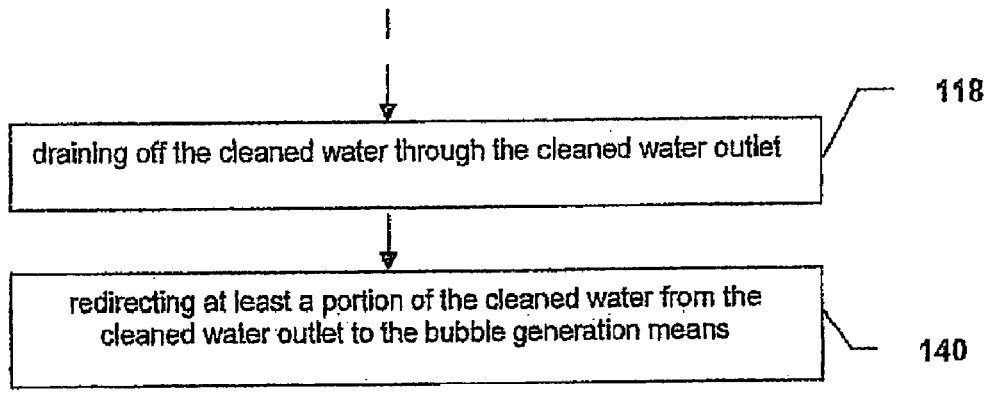
Figure 15:
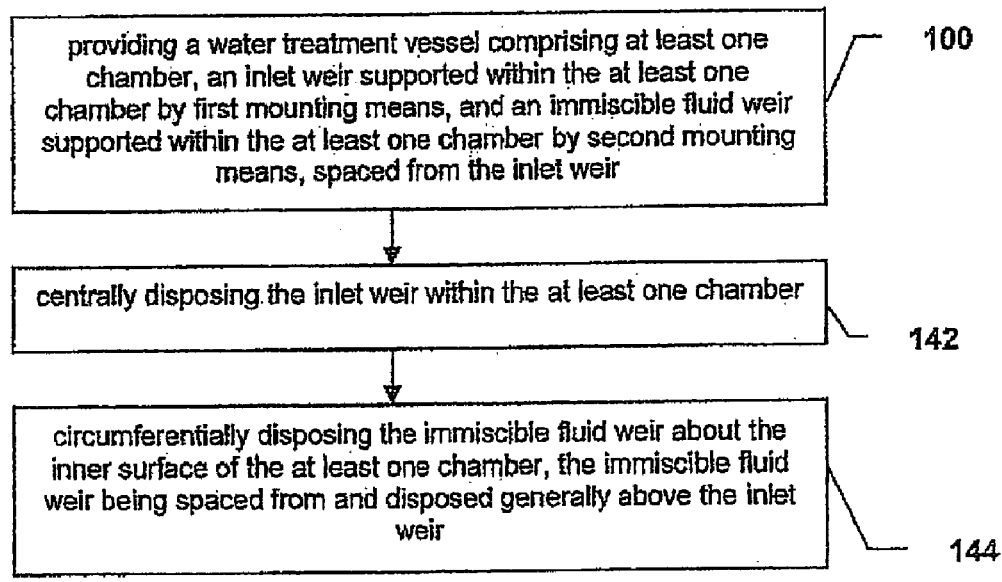
Figure 16:
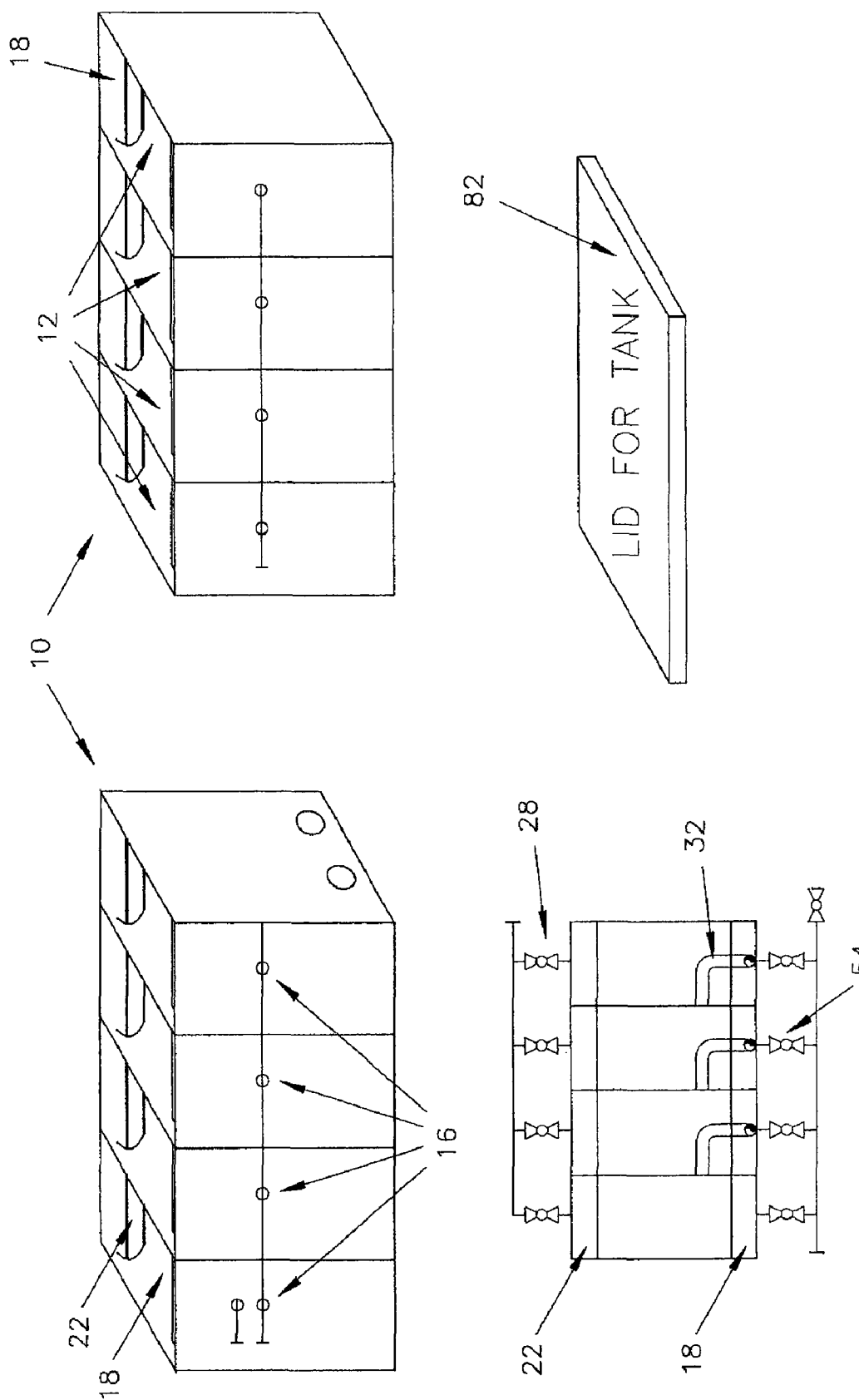
Figure 17:
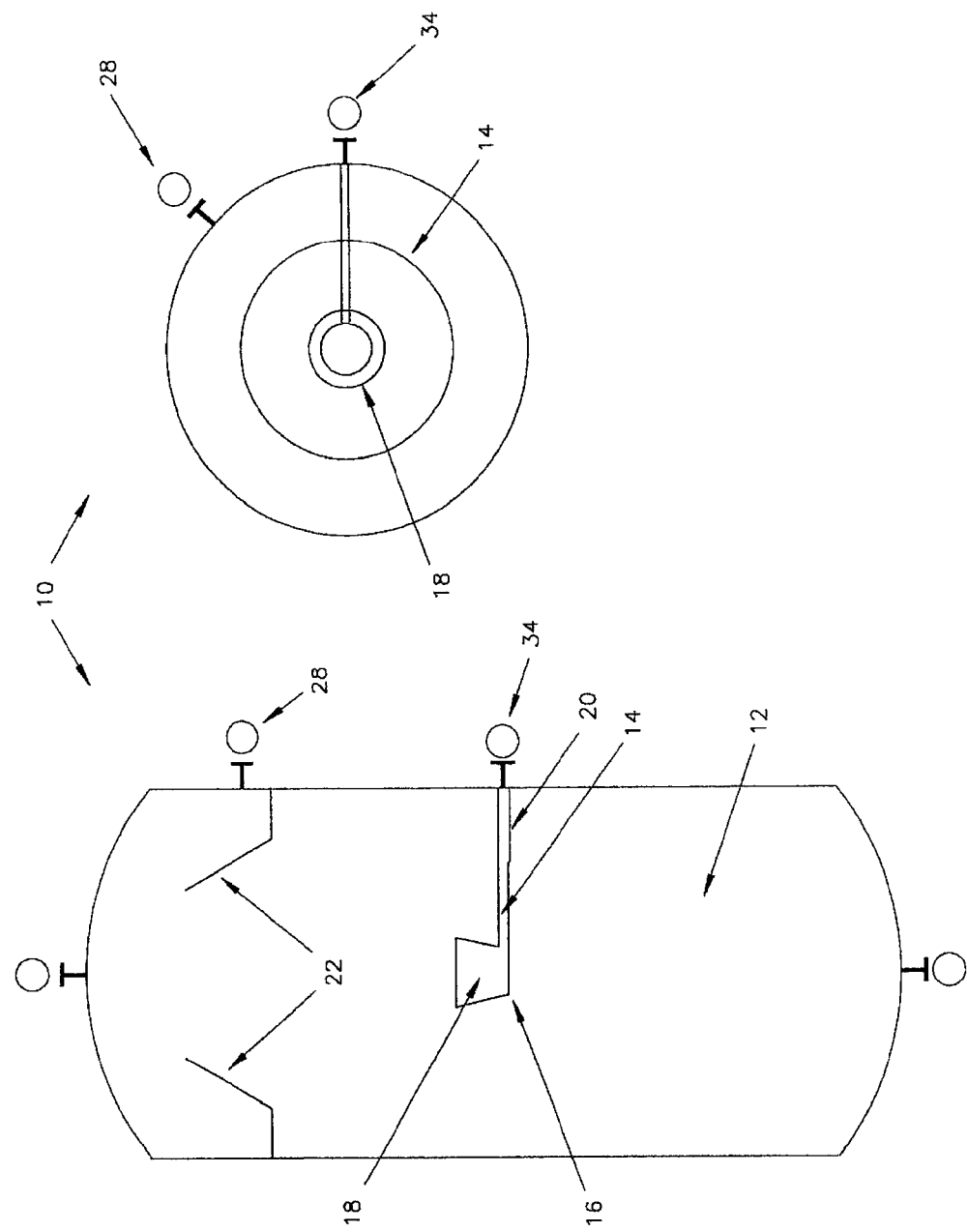
Figure 18:
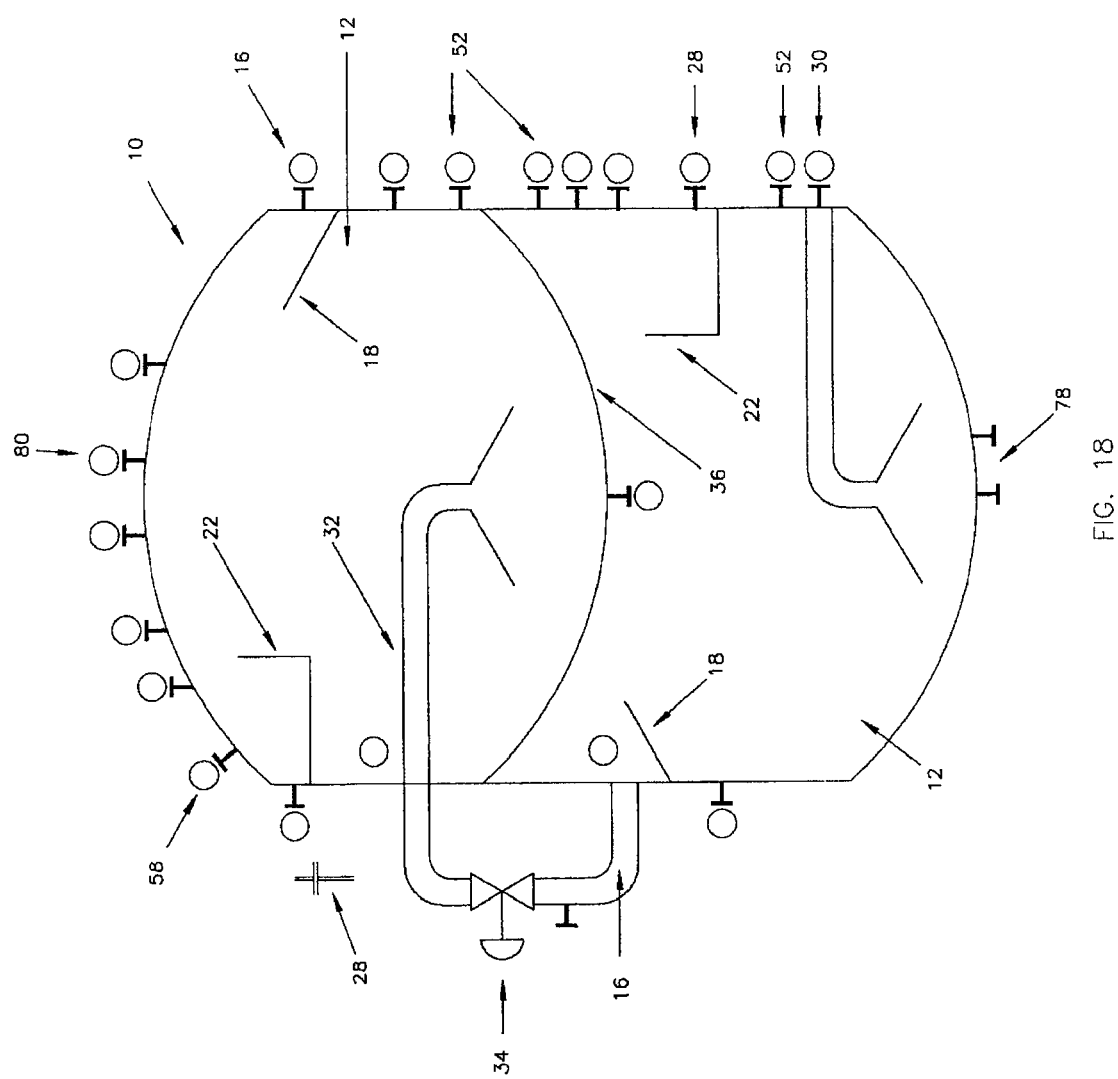
Figure 19:
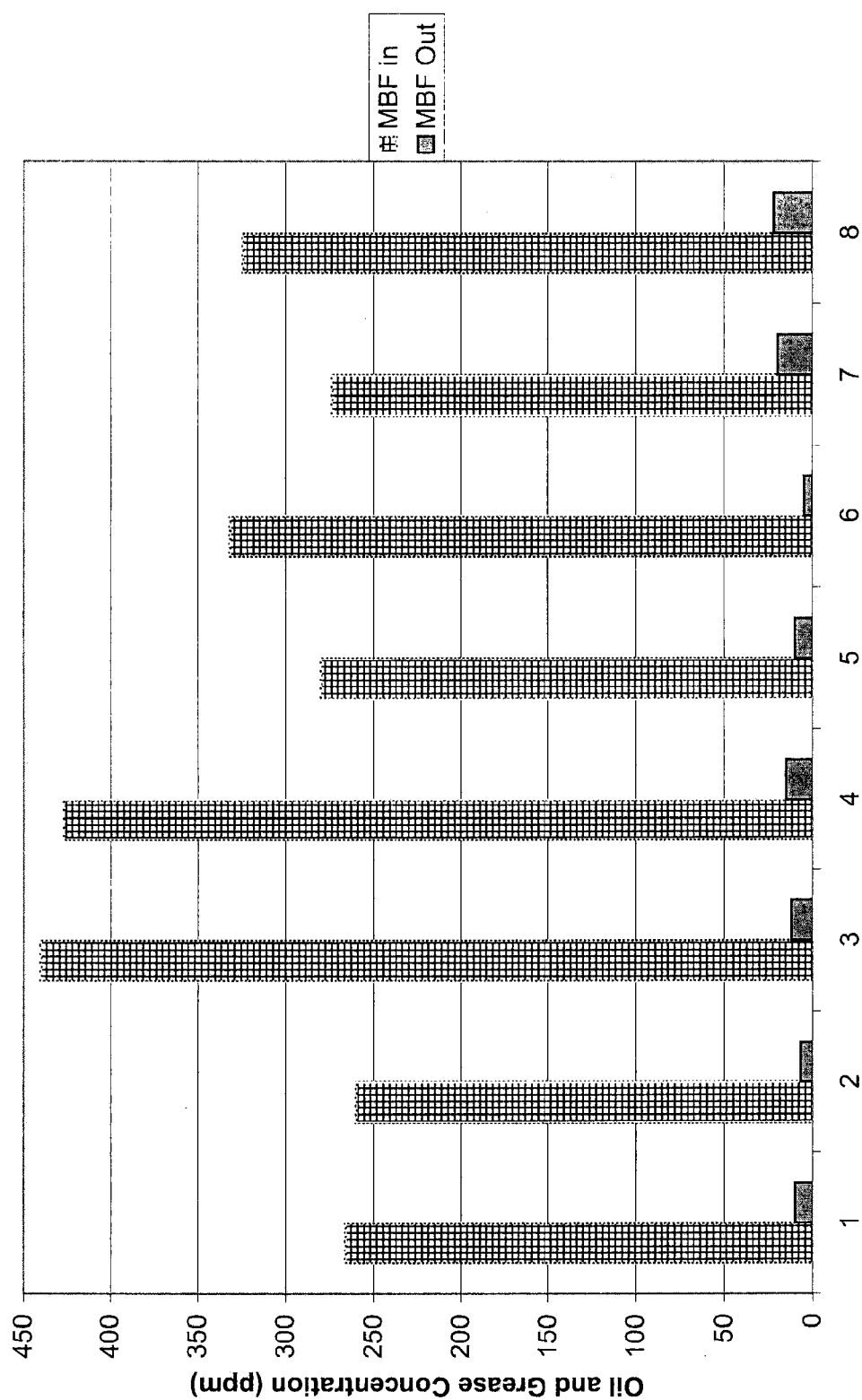

FIG. 8*a* is a top plan view of a skim tank incorporating an embodiment of the present invention, comprising two horizontally disposed chambers;

FIG. 8*b* is a cross-sectional view of the skim tank along line A-A of FIG. 8*a*;

FIG. 8*c* is a cross-sectional view of the skim tank along line B-B of FIG. 8*a*;

FIG. 8*d* is a detail view of the inlet weirs of the embodiment of FIG. 8*a*;

FIG. 8*e* is a detail view of the immiscible fluid weir of the embodiment of FIG. 8*a*;

FIG. 9a is a top plan view of a skim tank incorporating an embodiment of the present invention, comprising four horizontally disposed chambers;

FIG. 9b is a cross-sectional view of the skim tank along line A-A of FIG. 9a;

FIG. 9c is a cross-sectional view of the skim tank along line B-B of FIG. 9a;

FIG. 9d is a detail view of the inlet weirs of the embodiment of FIG. 9a;

FIG. 9e is a detail view of the immiscible fluid weir of the embodiment of FIG. 9a;

FIG. 10a is a top plan view of an embodiment according to the present invention wherein the vessel is vertically disposed but horizontally chambered, with two cross-sectional views;

FIG. 10b is a detail view of the inlet weirs of the embodiment of FIG. 10a;

FIG. 10c is a detail view of the immiscible fluid weir of the embodiment of FIG. 10a;

FIG. 11 is a flow chart illustrating a first method according to the present invention;

FIG. 12 is a flow chart illustrating a second method according to the present invention comprising steps of immiscible fluid weir adjustment and observation port clearing;

FIG. 13 is a flow chart illustrating a third method according to the present invention comprising steps of selective gas bubble injection and withholding of same;

FIG. 14 is a flow chart illustrating a fourth method according to the present invention involving redirection of cleaned water;

FIG. 15 is a flow chart illustrating a fifth method according to the present invention wherein the vessel is vertically oriented;

FIG. 16 is an illustration of a four-chambered horizontal embodiment according to the present invention;

FIG. 17 is a simplified top plan and elevation view of a single-chamber embodiment with a vertical orientation;

FIG. 18 is a simplified elevation view of a two-chambered embodiment with a vertical orientation; and FIG. 19 is a chart illustrating oil and grease concentration for various runs.

Corresponding reference numerals indicate corresponding parts throughout the several views of the drawings.

DETAILED DESCRIPTION

Example embodiments will now be described more fully with reference to the accompanying drawings.

Figure 1:
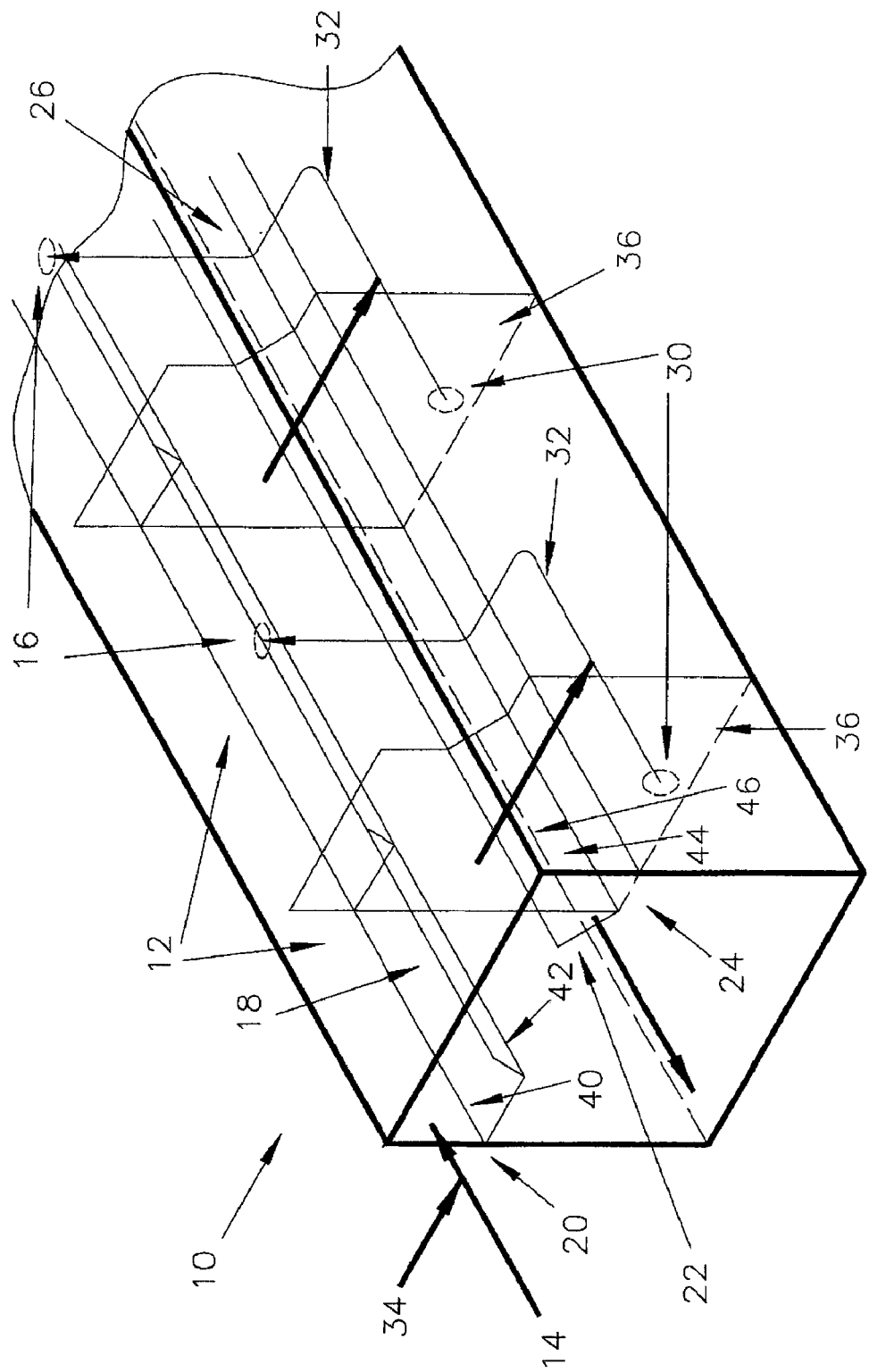

Referring now in detail to the accompanying drawings, there are illustrated several exemplary embodiments of water treatment vessels according to the present invention, each water treatment vessel generally referred to by the numeral 10. Referring specifically to FIG. 1, a simplified perspective view of a horizontally disposed vessel 10 is presented (this particular embodiment is rectangular in shape, although other shapes are possible, including some which are specifically addressed herein). The vessel 10 is divided into chambers 12 by means of vertical walls 36. An injection line 14 is in fluid communication with an inlet 16 of the first chamber 12, the injection line 14 for containing and transmitting contaminated water (not shown) from a source (not shown). The injection line 14 receives gas bubbles (not shown; preferably microbubbles, as discussed in detail below) from bubble injection means 34 which are in fluid communication with the injection line 14, allowing mixing in the injection line 14 of the gas bubbles and the contaminated water to form an inlet fluid (not shown), which process is described in detail below. The gas bubbles can be produced by any suitable bubble generation means, such as the apparatus and method for producing microbubbles in liquids taught in Canadian Patent Application No. 2,460,123, mentioned above, and may comprise a mixture of gas bubbles and water (which water may be wholly or partly derived from the cleaned water produced by use of the vessel 10).

An inlet weir 18 is supported within each of the chambers 12 by first mounting means 20 adjacent the inlet 16, while an immiscible fluid weir 22 (which can be of fixed or adjustable height, as discussed below) is supported within each of the chambers by second mounting means 24, and is spaced from the inlet weir 18. The inlet weir 18 comprises a base portion 40 and a wall portion 42, while the immiscible fluid weir also comprises a base portion 44 and a wall portion 46. The immiscible fluid weir 22 forms a sloped trough 26 for collecting the immiscible fluid (not shown) and allowing the immiscible fluid to flow out of the chambers through an immiscible fluid outlet 28 (which can be seen in two different embodiments in FIGS. 2a and 16) to an immiscible fluid retention tank (not shown). The immiscible fluid weir 22 is preferably composed of Kynar™, or polyvinylidene fluoride, a high molecular weight crystalline thermoplastic polymer of vinylidene fluoride which has well-known corrosion/chemical resistance properties.

When an inlet fluid is injected into the first chamber 12 (which process is described in detail below), it passes through the first inlet 16 and over the first inlet weir 18, after which the cleaned water (not shown) flows downwardly toward a cleaned water outlet 30, and a remaining mixture of the immiscible fluid and the gas bubbles floats across the first chamber 12 to pass over the immiscible fluid weir 22. In a multi-chamber embodiment such as that shown in FIG. 1, this partially cleaned water is then transmitted from the cleaned water outlet 30 of the first chamber 12 to a second inlet 16 within the inlet weir 18 of an adjacent second chamber 12 by means of a connecting pipe 32 (which pipe 32 will be sized to minimize hydraulic head, reducing friction losses to avoid substantial variations in working fluid levels in each chamber 12, as would be obvious to one skilled in the art). The connecting pipes 32 are preferably composed of Schedule 10 thickness steel. Additional bubble injection takes place by gas bubble injection means 34 on the connecting pipe 32, introducing new bubbles to the fluid passing through the vessel 10 and enabling further oil/water separation in each subsequent chamber 12; the bubble injection in subsequent chambers 12 preferably occurs near the inlet of the pipe 32, to enhance mixing time within the pipe 32. The immiscible fluid separated from the inlet fluid in each chamber 12 flows over and into the immiscible fluid weir 22, and then down the trough 26 to the immiscible fluid outlet 28.

Figure 2A:
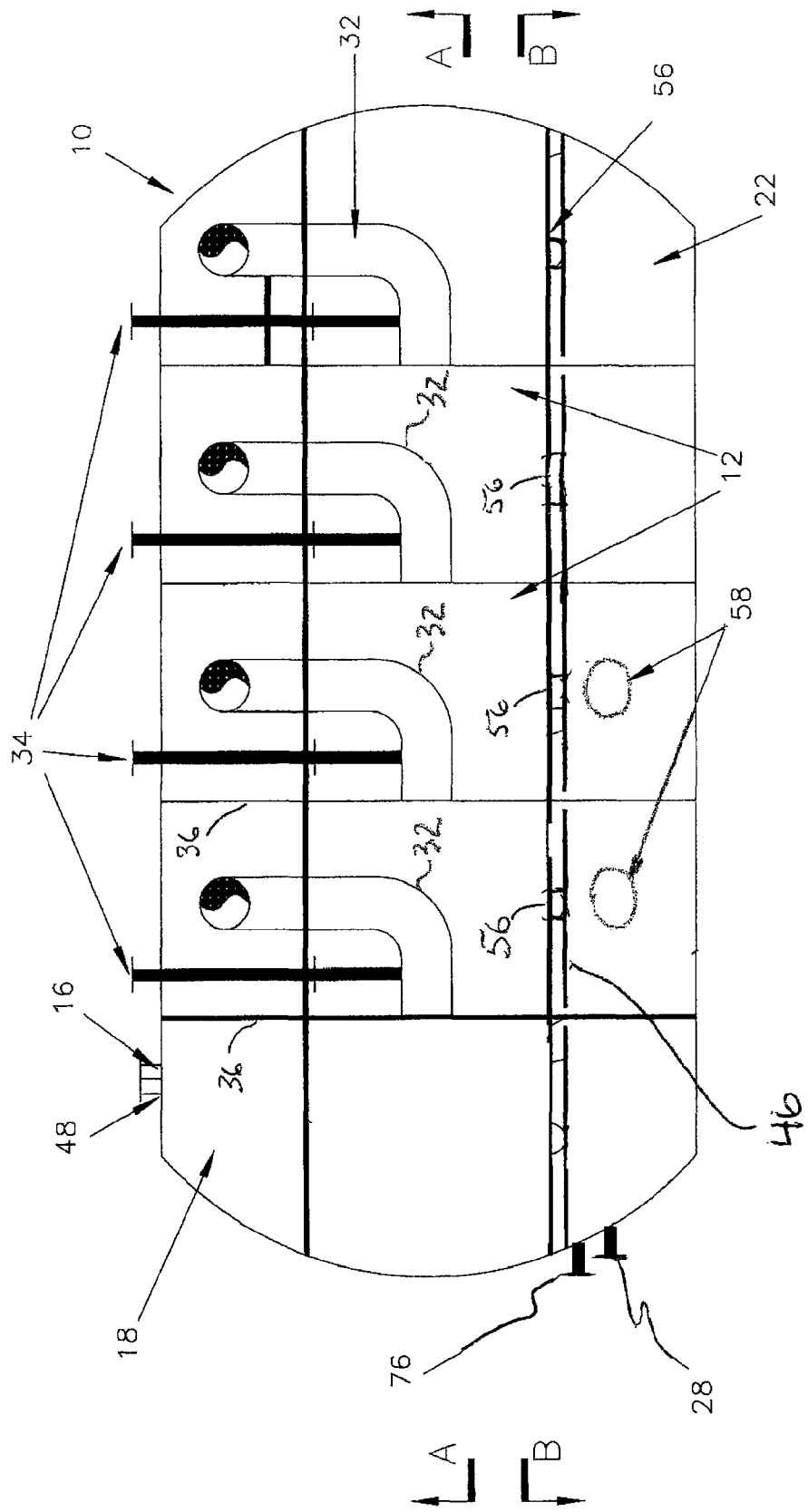
Figure 2B:
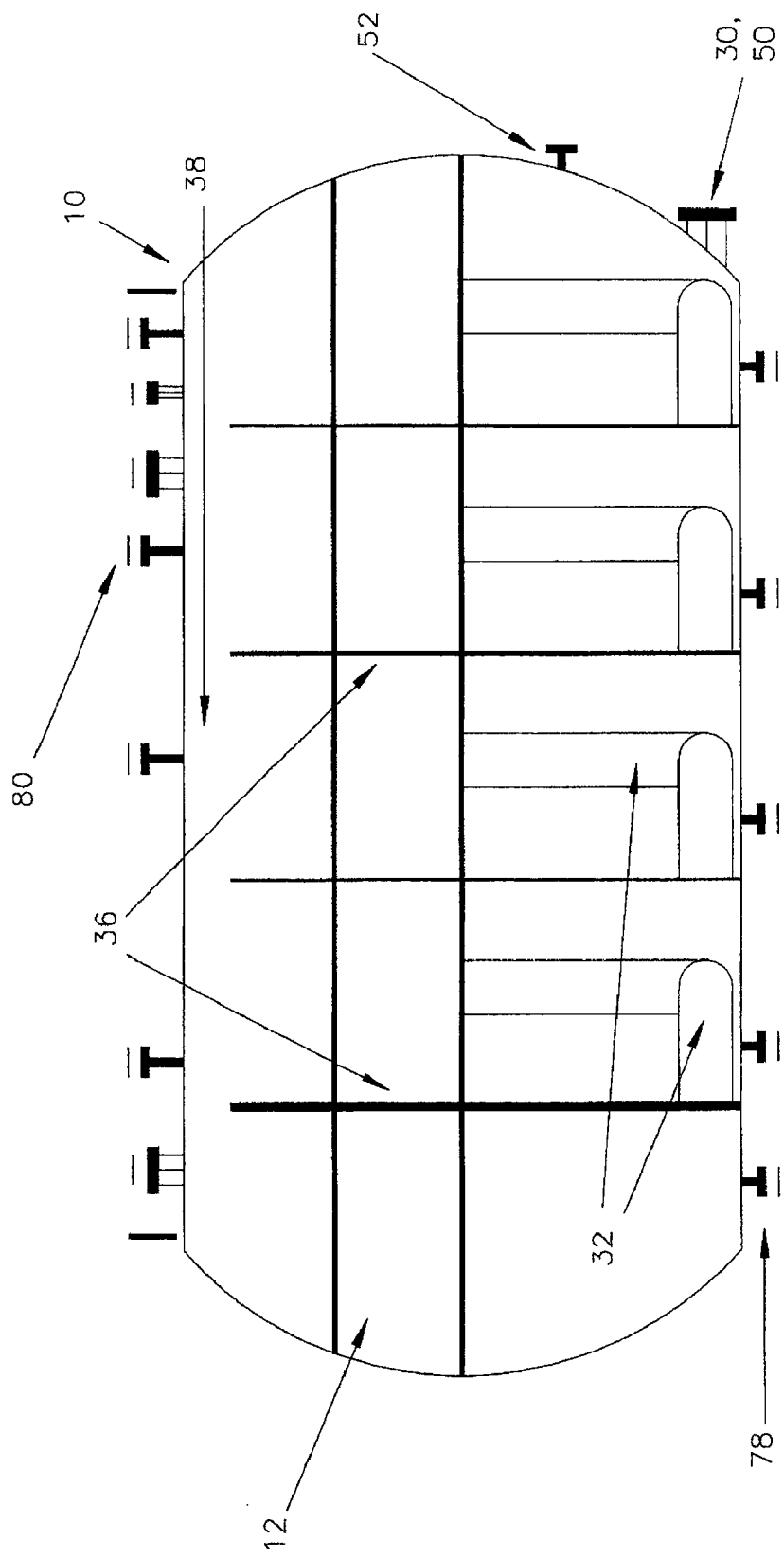
Figure 2C:
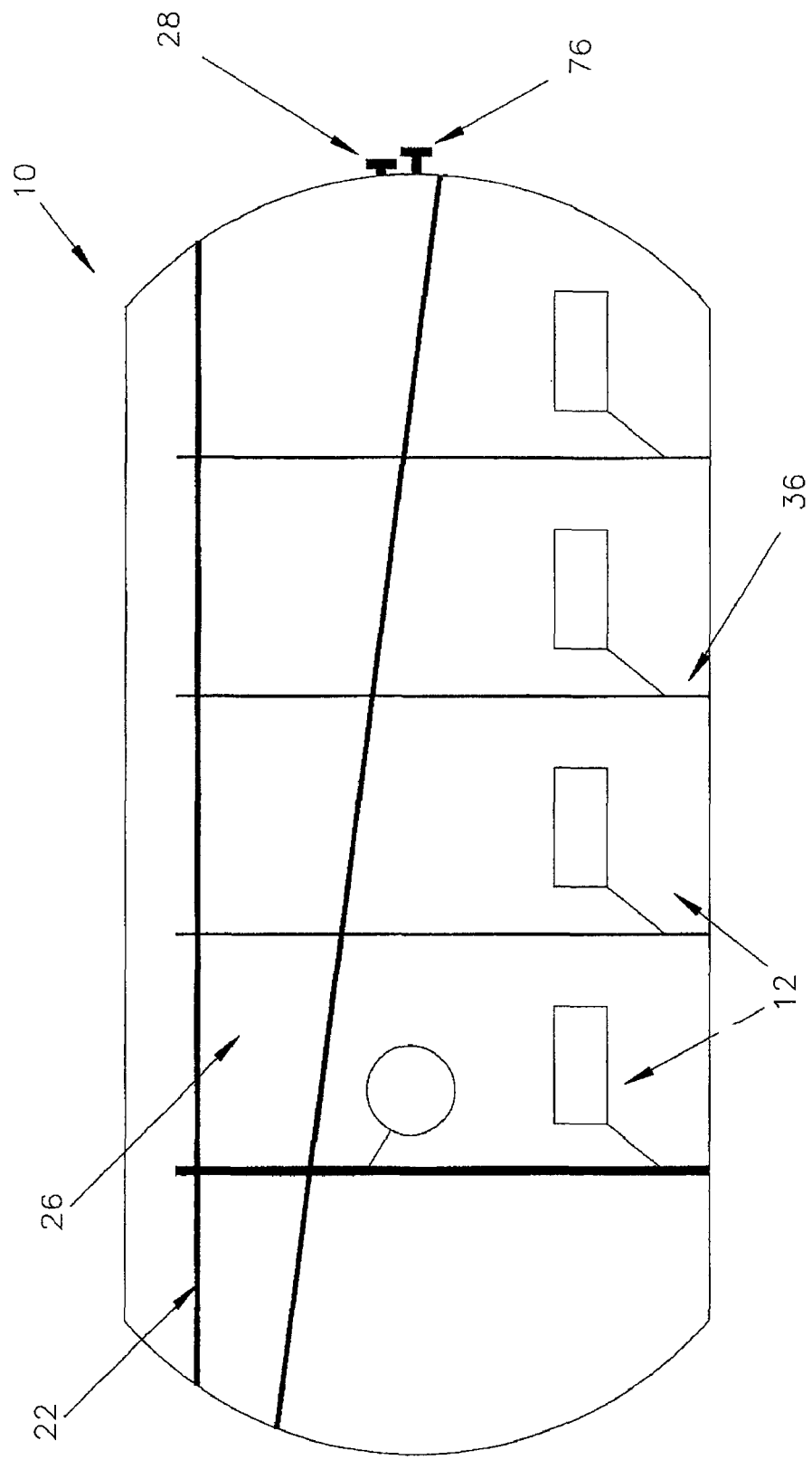

FIGS. 2a to 2d illustrate one embodiment of a vessel 10 according to the present invention, specifically a horizontally disposed, cylindrical vessel 10. As was the case with the simplified illustration of FIG. 1, this embodiment comprises a series of chambers 12 separated by walls 36, each chamber 12 fluidly communicating with the next by means of a connecting pipe 32, the first chamber 12 receiving inlet fluid via an inlet 16 (which comprises a nozzle 48). As can be seen in FIG. 2a, the vessel 10 comprises an inlet weir 18 running along the length of the vessel 10 on one side thereof (though divided by the walls 36), and an immiscible fluid weir 22 running parallel along the opposite side of the vessel 10. Although the immiscible fluid weir 22 could be divided by the walls 36 in some embodiments (as is the case in FIG. 16, discussed below), it is not divided in this embodiment but instead provides an integrated trough 26 (as shown in FIG. 2c) for receiving immiscible fluids from all of the chambers 12 and transmitting same towards the immiscible fluid outlet 28. The transmission of immiscible fluids along the trough 26 is aided in this embodiment by heating coils 76, and any heavy solids (not shown) or residual fluids at the end of the process can be drained out of each chamber 12 by means of drains 78.

Each of the connecting pipes 32 is provided with gas bubble injection means 34 to introduce new gas bubbles to the fluid moving from one chamber 12 to the next, as many of the gas bubbles introduced previously will have mixed with the immiscible fluid and passed over the immiscible fluid weir 22 rather than moving into the connecting pipe 32.

Figure 2D:
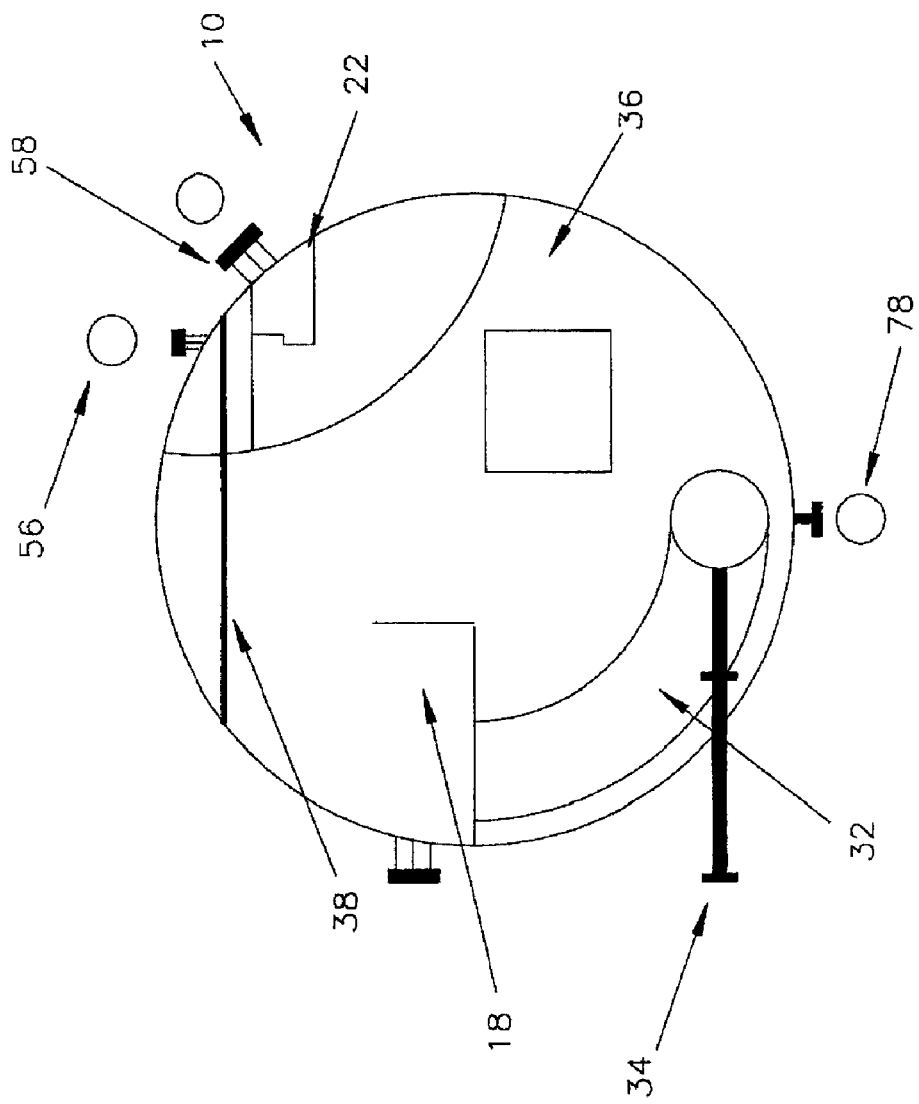
Figure 3A:
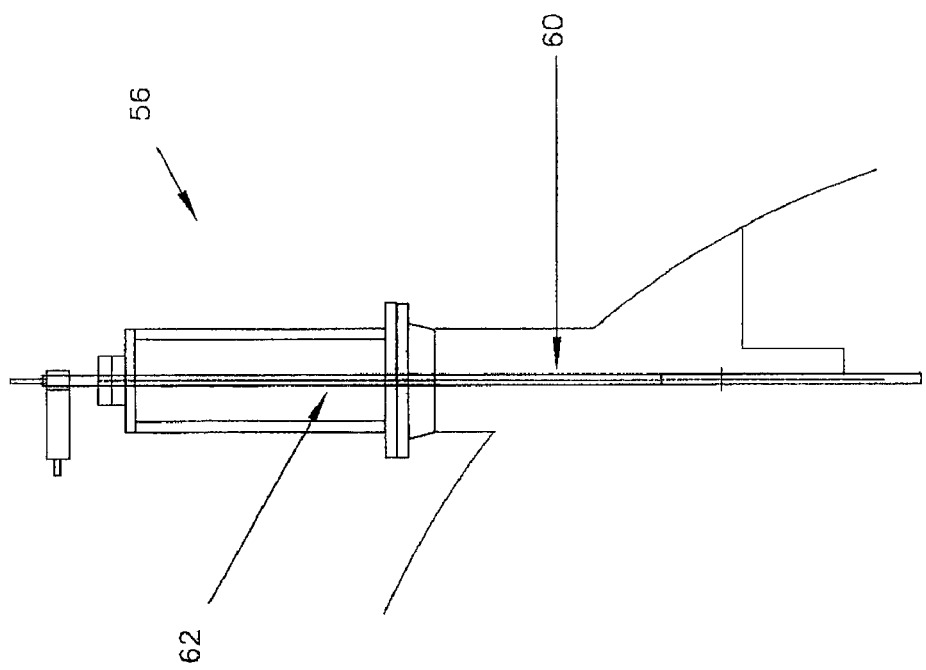
Figure 3B:
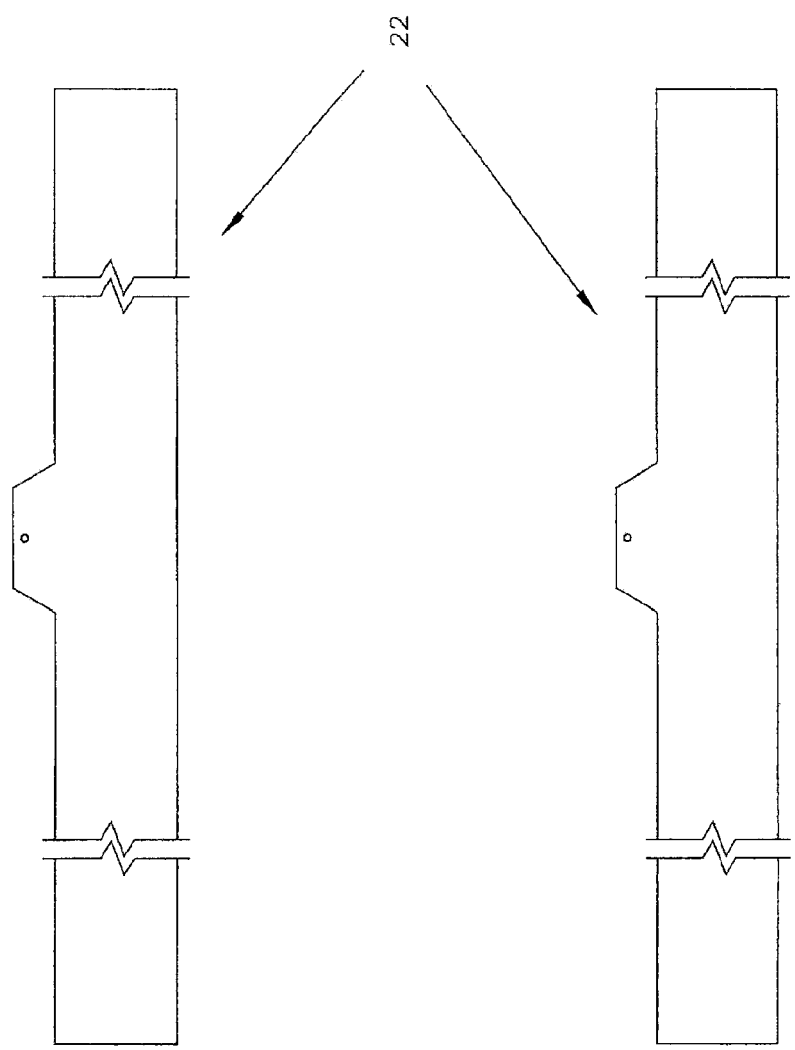

Weir adjustment means 56 may also be incorporated, and are shown in this embodiment. As fluid levels may vary within the chambers 12 of the vessel 10 during operation, it is preferable to provide for an immiscible fluid weir 22 that is height-adjustable to prevent unnecessary cleaned water loss. One embodiment of such weir adjustment means 56 is illustrated in FIGS. 3*a* and 3*b*, described below. Where it is desired to adjust immiscible fluid weir 22 height, or simply to visually monitor fluid levels in a closed vessel 10, observation ports 58 may also be provided, as shown in FIGS. 2*a* and 2*d* and described in detail below with reference to FIG. 5.

In order to maintain a steady state within the vessel 10, flow control means 52 are employed in this embodiment to control fluid exit at the final cleaned water outlet 30, and various alternative means would be obvious to anyone skilled in the art. In addition, this embodiment is provided with recycle flow means 50 in association with the cleaned water outlet 30, in order to utilize some of the cleaned water in a bubble/water mixture for injection by the gas bubble injection means 34. The vessel 10 of FIGS. 2*a* to 2*d* is also provided with a gas outlet 80, as gas may collect within the gap 38 above the walls 36 in the vessel 10.

FIGS. 3*a* and 3*b* illustrate an exemplary embodiment of weir adjustment means 56 according to the present invention. As can be seen, the weir adjustment means 56 in this embodiment comprise a threaded spindle 60 seated in a packing gland 62 (shown in FIG. 3*a*), which threaded spindle 60 connects to the immiscible fluid weir 22 (shown in FIG. 3*b*). As the spindle 60 is rotated, it moves up and down (depending on direction of rotation), converting rotational motion to linear motion and thereby moving the immiscible fluid weir 22 up or down accordingly in response. Other means for adjusting the weir 22 height would be obvious to one skilled in the art. By adjusting the weir 22 height to address fluid volume conditions in a given chamber 12 (as the weir 22 can be divided by the walls 36 to form discrete weirs 22 for each chamber 12), a user can limit the amount of cleaned water that is escaping over the wall portion 46 of the immiscible fluid weir 22, raising the weir 22 when the water/oil froth interface level is high and lowering it when the interface level is low.

Figure 4:
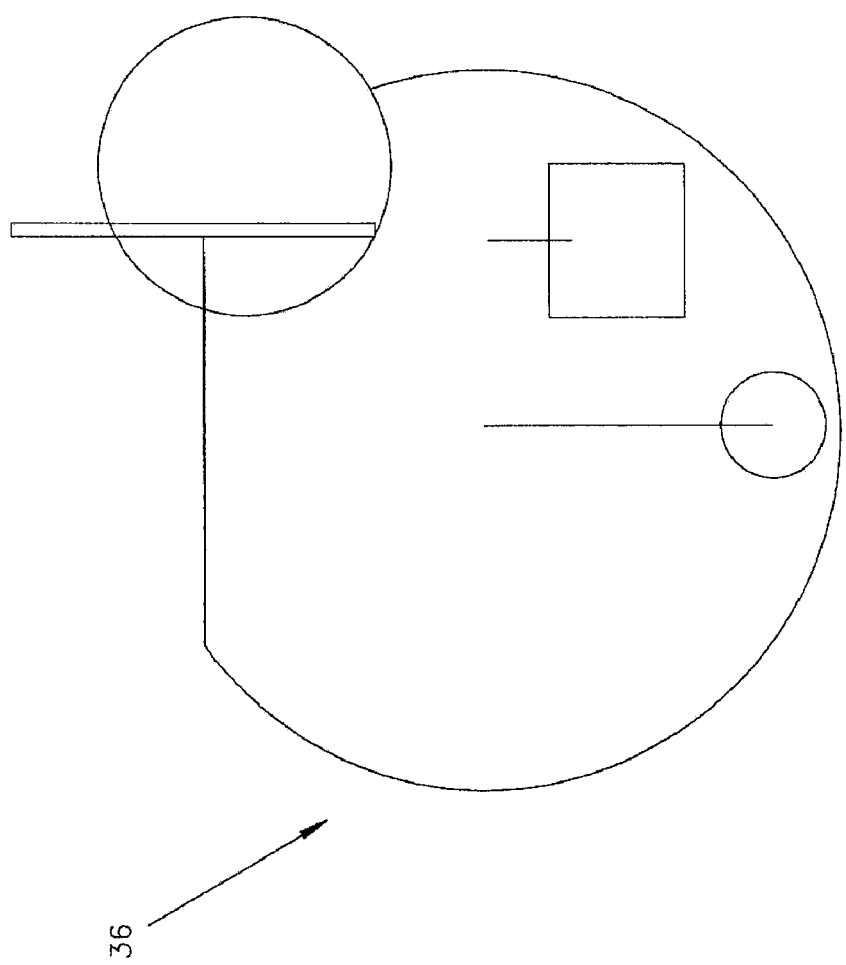
FIG. 4 is a detail view of a chamber dividing wall.

FIG. 4 illustrates an exemplary embodiment of a chamber-dividing wall 36, including cut-outs to receive an immiscible fluid weir 22 and allow passage of a connecting pipe 32 therethrough.

Figure 5:
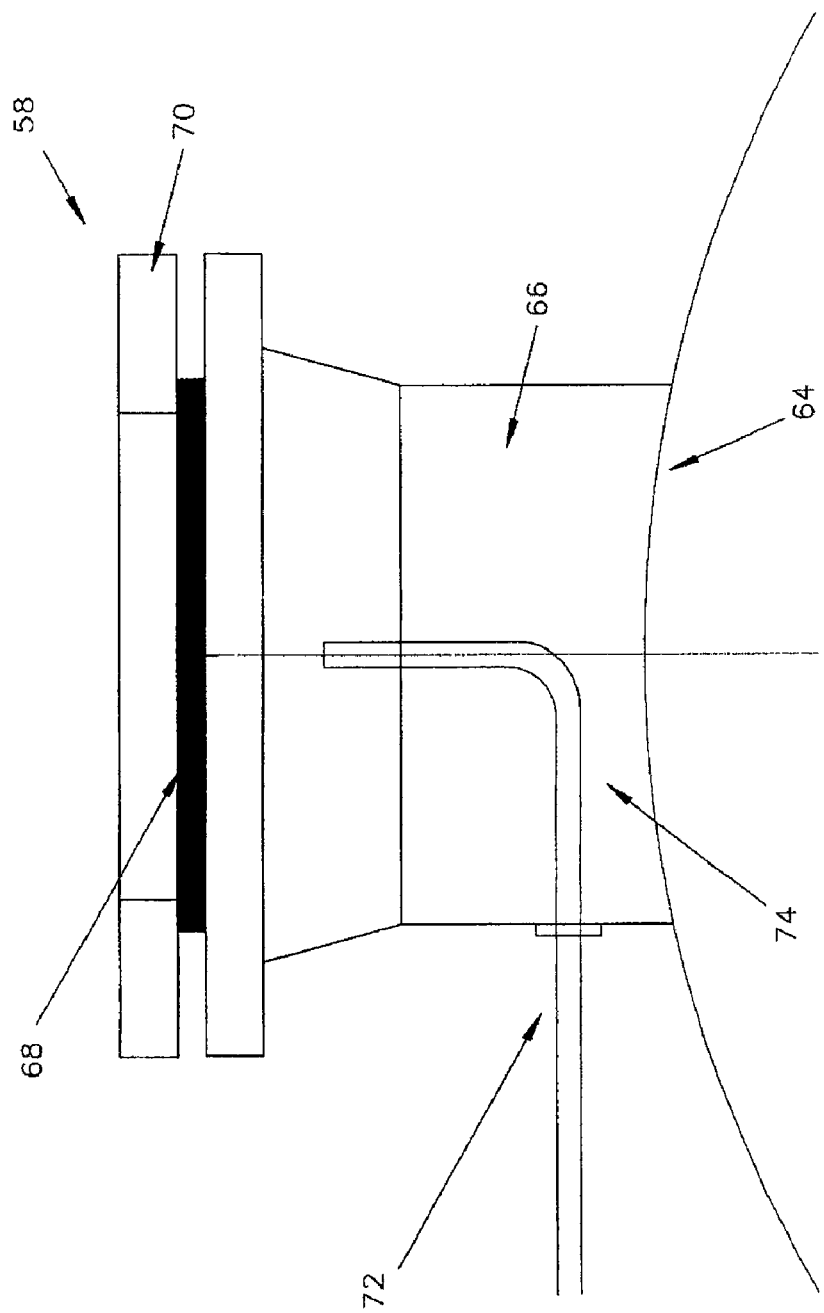
FIG. 5 is a detail view of an observation port with clearing means.

FIG. 5 illustrates an exemplary embodiment of an observation port 58 with observation port clearing means 72. In cases where the water treatment vessel 10 is closed, observation ports 58 provide means to visually inspect the state of the vessel 10 contents, and specifically the fluid levels therein (which would, for example, enable appropriate adjustment to the immiscible fluid weir 22 height by weir adjustment means 56). The vessel 10 is provided with an aperture 64 in an upper surface thereof, in which is seated a nozzle fitting 66. The nozzle fitting 66 is capped by a tempered glass viewing pane 68, which pane 68 is held in place by a retention member 70. It is necessary to provide for a properly sealed observation port 58 where the vessel 10 is a pressure vessel, however, sealing of the observation ports 58 may also have utility in other contexts, such as for preventing leakage during flow surges. The observation ports 58 may also be provided with observation port clearing means 72, as shown in FIG. 5; such means 72 in this exemplary embodiment comprise a conduit 74, which conduit 74 could, for example, be used to enable a steady injection of a small amount of gas to prevent vapour accumulation in the observation port 58, or alternatively to enable selective injection of warm water to keep the pane 68 clear. Other means for enabling vessel 10 content monitoring would be obvious to one skilled in the art, as would means for maintaining the functionality of the monitoring means.

Figure 6:
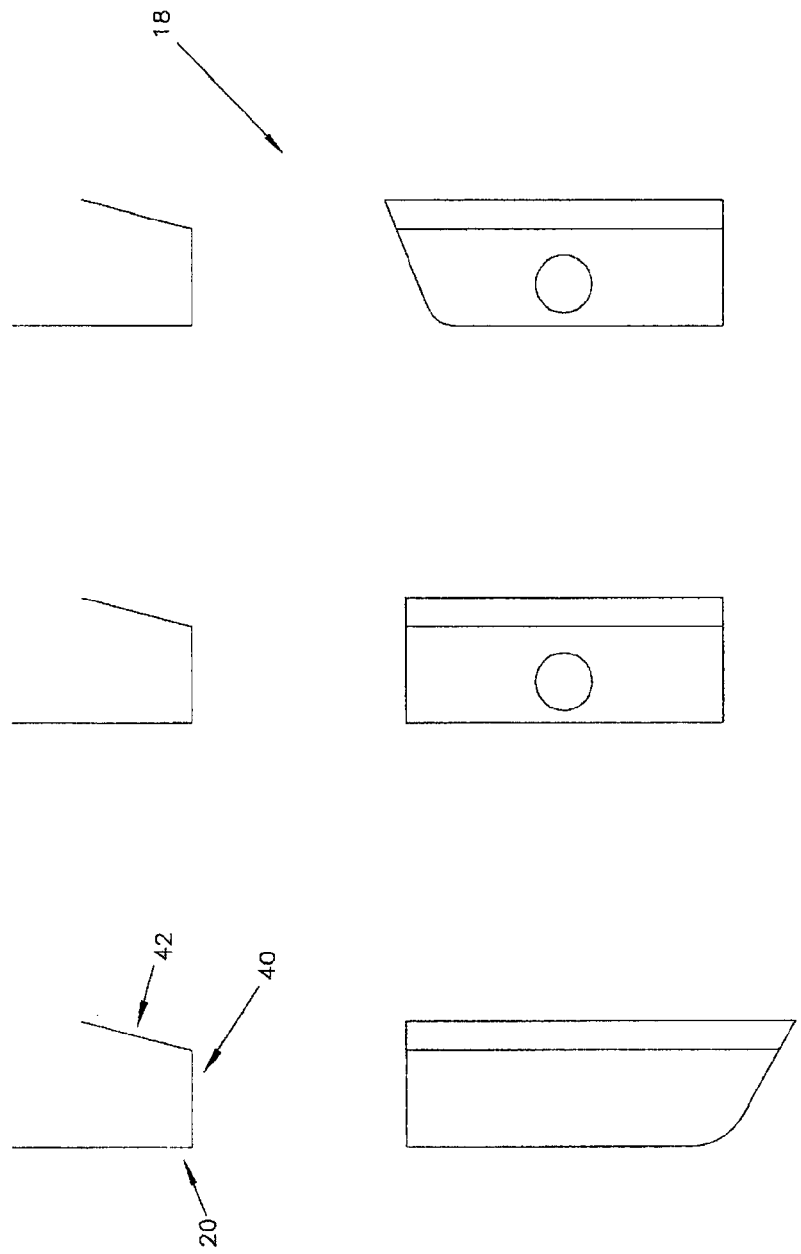
FIG. 6 is a detail view of inlet weirs for use in a five-chamber horizontal embodiment of the present invention.
Figure 7:
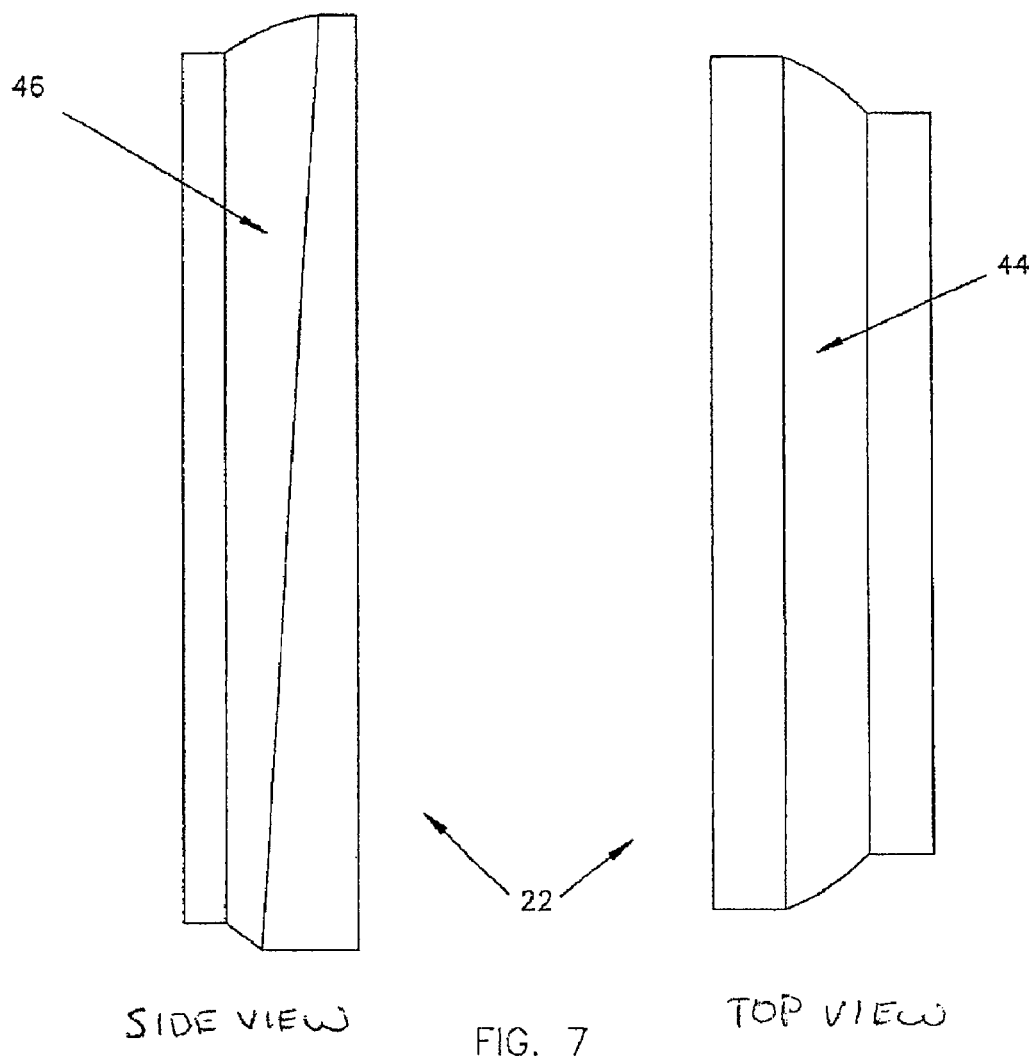
FIG. 7 is a detail view of an immiscible fluid weir.

FIGS. 6 and 7 show one embodiment of inlet weirs 18 and an immiscible fluid weir 22 for use in a five-chamber horizontal, cylindrical vessel 10. It can be seen in FIG. 6 that the wall portion 42 of the inlet weirs 18 is angled away from the point at which the base portion 40 would be attached to the vessel 10 at the first mounting means 20. Due to the cylindrical shape of the vessel 10, the inlet weirs 18 for the first and fifth chambers 12 would have a curved edge to mate with the inner chamber 12 surface, and the inlet weirs 18 for all chambers 12 but the first would be provided with means to receive a connecting pipe 32. In this embodiment of the immiscible fluid weir 22, as seen in FIG. 7, the base 44 and wall 46 portions of the weir 22 have curved edges where appropriate for mating with the vessel 10 inner surfaces.

FIGS. 8*a* to 8*e* illustrate another embodiment of a vessel 10 according to the present invention, specifically a two-chamber, horizontally disposed vessel 10 with an API or "skim tank" configuration. As was the case with the embodiments of FIGS. 1 and 2*a*, the vessel 10 is divided into chambers 12 by a vertical wall 36, the chambers 12 in fluid communication via a connecting pipe 32, gas bubble injection means 34 introduce gas bubbles into the connecting pipe 32, and inlet weirs 18 and an immiscible fluid weir 22 are disposed opposite to each other across the chamber 12 with the immiscible fluid weir 22 in fluid communication with the immiscible fluid outlet 28. However, unlike the embodiments of FIGS. 1 and 2*a*, this embodiment comprises two inlet weirs 18 mounted on opposite sides of the vessel 10, with the immiscible fluid weir 22 centrally mounted within the vessel 10 and extending diametrically across the interior, situated above the dividing wall 36. The immiscible fluid weir 22 still forms a trough 26 (as can be seen in FIGS. 8*c* and 8*e*), with heating coils 76, but that trough 26 receives a mixture of immiscible fluid and gas bubbles simultaneously from two directions—a first mixture is received from the first chamber 12 (labelled "Chamber #1"), and when cleaned water from the first chamber 12 flows through the connecting pipe 32 to the second chamber 12 (labelled "Chamber #2") it is mixed with gas bubbles to form an inlet fluid that will separate in the second chamber 12 to produce a bubble/immiscible fluid mixture that will flow into the immiscible fluid weir 22 from the second chamber 12. Again, the inlet weirs 18 comprise a wall portion 42 that is angled away from the vessel 10 inner surface, and the inlet weirs 18 and immiscible fluid weir 22 have curved edges to enable proper mating with the vessel 10 inner surface.

FIGS. 9*a* to 9*e* illustrate yet another embodiment of the present invention, specifically a four-chamber, horizontally disposed vessel 10 with an API or "skim tank" configuration. The structure is very similar to that of the embodiment of FIGS. 8*a* to 8*e*, sharing many elements, and there is no difference in terms of the immiscible fluid weir 22 and related components. However, this embodiment is provided with additional walls 36 to divide the vessel 10 interior into four chambers 12 of generally equal volume. Accordingly, the vessel 10 is provided with additional connecting pipes 32 (with gas bubble injection means 34, as shown in FIG. 9d) to allow for fluid communication between the four chambers 12 (the first chamber 12 connecting to the second chamber 12, the second chamber 12 to the third, etc.), and the inlet weirs 18 on opposed sides of the vessel 10 are divided roughly in half by the walls 36 to form a total of four discrete inlet weirs 18.

FIGS. 10a to 10c illustrate yet another embodiment of the present invention, this time a four-chamber, vertically disposed vessel 10. As was the case with the embodiment of FIGS. 9a to 9e, with which this embodiment shares many features, the vessel 10 interior is divided into four chambers 12 of generally equal volume by walls 36 which extend upwardly from the bottom of the vessel 10 to the immiscible fluid weir 22, leaving a gap 38 above the immiscible fluid weir 22. The walls 36 again divide the opposed inlet weirs 18 roughly in half, resulting in four discrete inlet weirs 18, all in fluid connection in series by means of connecting pipes 32 (with gas bubble injection means 34) at inlets 16.

FIG. 16 illustrates yet another embodiment of the present invention, a rectangular, four-chamber, horizontally disposed vessel 10. This embodiment employs a lid 82 for removably sealing the vessel 10, and a different immiscible fluid weir 22 arrangement than in the embodiments discussed above. In this embodiment, there are four chambers 12 divided by walls 36, in fluid communication by means of connecting pipes 32, but the walls 36 divide not only the inlet weirs 18 but also the immiscible fluid weir 22, resulting in four discrete immiscible fluid weirs 22. Each of the discrete immiscible fluid weirs 22, therefore, has a corresponding immiscible fluid outlet 28 which would be provided with a nozzle to allow flow to a common outlet header (not shown) for drainage. In this embodiment, the inlets 16 for the inlet weirs 18 are provided with globe valves 54 to control the flow of microbubbles into the chambers 12.

Another vertically disposed vessel 10 configuration is illustrated in FIG. 17. In this embodiment, the vessel 10 has only a single chamber 12. The injection line 14, with associated gas bubble injection means 34, extends across the vessel 10 interior to a generally central location within the chamber 12; the injection line 14 may be contained within a rigid pipe or supported by a rib extending from the vessel 10 inner surface, which would be the first mounting means 20, although other support/mounting means are possible within the scope of the present invention and would be obvious to one skilled in the art. The injection line 14 is in fluid communication with an inlet 16, which inlet 16 allows for introduction of inlet fluid into the centrally disposed inlet weir 18. A peripherally disposed immiscible fluid weir 22 is mounted around the inner surface of the vessel 10, with an immiscible fluid outlet 28 in fluid communication therewith.

A two-chambered embodiment of a vertically disposed vessel 10 configuration is illustrated in FIG. 18. In this embodiment, the vessel 10 has two chambers 12 separated by a wall 36. The inlet 16 allows injection of contaminated water (which has been mixed with microbubbles, not shown) against and over the inlet weir 18 in the uppermost chamber 12, with the mixture of microbubbles and immiscible fluid floating across the uppermost chamber 12, passing over the immiscible fluid weir 22, and flowing out of the immiscible fluid outlet 28. The remaining fluid passes downwardly toward an inlet of the connecting pipe 32, and thence past gas bubble injection means 34 where additional gas bubbles are mixed with the fluid before the fluid moves into the lowermost chamber 12. Upon entering the lowermost chamber 12, the fluid flows against and over the inlet weir 18, the bubble/immiscible fluid again moving across the chamber 12 to pass over the immiscible fluid weir 22 and out the immiscible fluid outlet 28. The remaining cleaned water then flows out the cleaned water outlet 30. This embodiment is also provided with an observation port 58, a gas outlet 80, flow control means 52, and a drain 78, as described in detail above with respect to similar embodiments.

The present invention also comprises various methods for separating water and immiscible fluids. FIGS. 11 to 15 illustrate methods, or parts of methods, according to the present invention.

Referring now to FIG. 11, which sets out a basic method according to the present invention for cleaning contaminated water, the first step (at 100) is to provide a water treatment vessel comprising at least one chamber, an inlet weir supported within the at least one chamber by first mounting means, and an immiscible fluid weir supported within the at least one chamber by second mounting means, spaced from the inlet weir. The vessel is sized to provide sufficient residence time as per customer specifications, which residence times are typically 10 minutes. The next step (at 102) is to transmit the contaminated water from its source toward that chamber via an injection line. Contaminated water entering the vessel is usually produced water received from primary separation units such as a "Free Water Knockout" (FWKO) unit or "treater". The composition of this produced water varies considerably between sites and contents can fluctuate largely depending on the sites' operations. Typical oil and grease concentrations vary between 50 ppm and 2000 ppm, and oil properties (including density and viscosity) vary by site. Oil can be found in an emulsified form, as either a reverse emulsion or a normal emulsion, and certain clarifier chemicals may be added to aid in the flotation, on top of those chemicals that are already added to the system for normal operations. Total suspended solids and trace chemical compounds (such as sulphur and iron compounds) concentrations are also site specific. Water inlet temperature can vary from 20° C. to 90° C. In some methods according to the present invention, clean water could also be introduced into the vessel before injection of the contaminated water.

Bubble generation means are provided for generating bubbles at 104, and the bubbles are generated and injected into the injection line at 106. Bubble generation means may include those taught in Canadian Patent Application No. 2,460,123, mentioned above, where gas experiences shear, impact and pressure resulting in bubbles 5 to 50 microns in diameter. Smaller bubbles more effectively separate oil from water, resulting in a drier froth and low skim volume. The bubbles are then allowed to mix with the contaminated water in the injection line, forming an inlet fluid at 108. The bubbles are being used before separation ever takes place, the intent being to form a mixture, unlike some competitive separation technologies which generate/inject bubbles to directly and immediately cause separation of oil out of the water. As shown in FIG. 16, globe valves 54 can be positioned adjacent the inlets 16 to control the inlet fluid injection; the globe valves 54 can also be used to create a pressure drop. The inlet fluid is reduced in pressure across the globe valves 54, with the result that some of the dissolved gas is released from solution and forms bubbles; some of the bubbles that are already in the inlet fluid grow with this pressure reduction and an area of turbulence is set up at the injection point that encourages the bubbles to contact the oil and also causes the gas bubbles to coalesce and enhance the flotation in the vessel 10.

The inlet fluid is then injected at 110 into the chamber at an inlet adjacent the inlet weir, and the inlet fluid is allowed to pass over the inlet weir at 112. Separation of water and immiscible fluid then occurs at 114, with the cleaned water being allowed to flow downwardly under force of gravity to a cleaned water outlet at 116 and this cleaned water is drained off at 118. The remaining mixture of immiscible fluid and gas bubbles is then allowed to float across the chamber and over the immiscible fluid weir at 120, and the immiscible fluid is finally allowed to collect in a trough and flow out an immiscible fluid outlet at 122. The drawing of fluid from the last chamber results in a pressure drop that drives the system; the water flows through the system by gravity and hence there is a hydraulic gradient through the vessel, so any connecting pipes (as described below with respect to FIG. 13) are preferably sized to minimize the pressure drop.

Referring now to FIG. 12, steps relating to immiscible fluid weir height adjustment, observation ports and clearing means are illustrated, which are preferably but not necessarily part of a method according to the present invention. As there is a hydraulic gradient through the vessel, and the interconnecting pipe is therefore sized to minimize the pressure drop, there will usually be a slight difference in level in each chamber. This difference in level means that the oil weirs have to be adjustable to minimize water loss with the oil. After step 100 set out above, a step 124 can be included whereby the vessel is provided with immiscible fluid weir height adjustment means, at least one observation port, and observation port clearing means. The method can then incorporate the step (at 126) of observing the fluid level in the chamber by means of the observation port, to enable adjusting the immiscible fluid weir height adjustment means to minimize cleaned water loss over the immiscible fluid weir. The immiscible fluid weir height adjustment means can then be adjusted at 128 to minimize cleaned water loss over the immiscible fluid weir, and gas or water can be injected into the observation port at 130 to clear the port of any build-up. It will be appreciated by persons skilled in the art that there would not be a sharp separation between the frothy immiscible fluid and the cleaned water, which fact would be taken into account when establishing an appropriate immiscible fluid weir height.

In methods where the vessel is provided with at least two chambers, the at least two chambers in fluid communication by means of at least one connecting pipe, which is shown at step 132 of FIG. 13, the method preferably comprises allowing the cleaned water at 134 to pass from the bottom of a first of the at least two chambers to a point adjacent the inlet weir of an adjacent second of the at least two chambers by means of the at least one connecting pipe. At step 136, gas bubbles are then selectively injected at a location in the at least one connecting pipe spaced from the inlet weir of the adjacent second of the at least two chambers, and gas bubble injection is withheld at step 138 in the at least one connecting pipe leading into a last of the at least two chambers, thereby forming a calming zone. Provision is preferably made for the addition of bubbles between the next-to-last and last chambers so that they can be added if there is a sudden surge in the inlet oil concentration which cannot be adequately handled by the first chambers. While testing of vessels according to the present invention has confirmed that as much as 90% of the oil can be removed from the inlet fluid in the first chamber alone, additional chambers have proven useful in removing additional amounts of contaminant.

FIG. 14 illustrates another optional step, where after step 118 (shown in FIG. 11) a step 140 may be undertaken whereby at least a portion of the cleaned water from the cleaned water outlet is redirected to the bubble generation means. Approximately half of the recycle flow is preferably redirected to the bubble generation means for mixing with the contaminated water. The bubbles and entrained oil are therefore in intimate contact upon entering the vessel, and this mixed flow enters the inlet and overflows the inlet weir into the first chamber.

FIG. 15 illustrates steps relating to vertically oriented vessels such as that illustrated in FIG. 17. In such a case, and after step 100, the inlet weir is centrally disposed within the at least one chamber at 142, and the immiscible fluid weir at 144 is circumferentially disposed about the inner surface of the at least one chamber, the immiscible fluid weir being spaced from and disposed generally above the inlet weir.

Referring again to the embodiment of FIGS. 8a to 8e, the vessel 10 would be sized to allow for sufficient residence time, usually between 60 and 120 minutes depending on customer specifications, but with additional volume to allow for surge capacity. To prevent short-circuiting of bubbles and oil through the system, downward velocity of fluid flow through each chamber 12 is preferably maintained below 1.4 ft/min. In a method incorporating a vessel 10 in accordance with the embodiment of FIGS. 9a to 9e or FIG. 17, residence times are typically kept at approximately 10 minutes, with appropriate downward velocities being maintained, as would be appreciated and understood by someone skilled in the art.

Test Results

A test vessel was manufactured on the same configuration as that illustrated in FIG. 16. The test vessel had the following characteristics:

Volume (total)=1.4 m$^3$
Volume (1$^{st}$ chamber)=0.39 m$^3$
Volume (2$^{nd}$ chamber)=0.31 m$^3$
Volume (3$^{rd}$ chamber)=0.35 m$^3$
Volume (4$^{th}$ chamber)=0.35 m$^3$ The working volume was approximately 85% of the capacities listed above, and therefore:

Working volume (total)=1.2 m$^3$
Working volume (1$^{st}$ chamber)=0.33 m$^3$
Working volume (2$^{nd}$ chamber)=0.26 m$^3$
Working volume (3$^{rd}$ chamber)=0.30 m$^3$
Working volume (4$^{th}$ chamber)=0.30 m$^3$ The diameter of the interconnecting piping was 3 inches.
The run conditions were as follows:
The microbubbles were created using bubble generation means in accordance with Canadian Patent Application No. 2,460,123, mentioned above.

Flow rate through the bubble generation means=5 usgpm
Produced water flow rate=10 gpm
Back pressure on the bubble generation means=60 psi
Pressure of gas to the bubble generation means=110 psi
Water temperature=62 degrees C.

The test runs were conducted using a method according to the present invention.

The results of the test runs are set out in Table 1 (below) and FIG. 19. Note that "MBF" refers to a microbubble flotation unit.

TABLE 1

| Produce | |
|---|---|
| Sample Location | Oil and Grease (mg/L) |
| MBF In | 263 |
| MBF Out | 6 |
| MBF In | 257 |
| MBF Out | 4 |
| MBF In | 441 |
| MBF Out | 10 |
| MBF In | 427 |
| MBF Out | 12 |

TABLE 1-continued

| Produce | |
|---|---|
| Sample Location | Oil and Grease (mg/L) |
| MBF In | 279 |
| MBF Out | 7 |
| MBF In | 332 |
| MBF Out | 5 |
| MBF In | 271 |
| MBF Out | 14 |
| MBF In | 318 |
| MBF Out | 15 |

As can readily be seen from the test results, a vessel and method according to the present invention was highly effective in removing immiscible fluid content from contaminated water. The vessel required a minimal retention period, removed oil droplets less than 50 microns in diameter, and could handle solids, flow rate fluctuations, and oil concentrations of greater than 300 ppm. The vessel also had a relatively small footprint, without any moving parts, and it would be clear to persons skilled in the art that the technology can be used for retrofit of existing tanks.

While particular embodiments of the present invention have been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiments. The invention is therefore to be considered limited solely by the scope of the appended claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A water treatment vessel for removing immiscible fluid from contaminated water to produce cleaned water, the vessel disposable in a vertical orientation, comprising:
    a chamber;
    an injection line in fluid communication with an inlet of the chamber, the injection line for containing and transmitting the contaminated water from a source to inlet weir means located in said chamber;
    bubble generation means in fluid communication with the injection line for injecting gas microbubbles into the injection line and allowing mixing in the injection line of the gas microbubbles and the contaminated water to form an inlet fluid;
    said inlet weir means comprising at least a pair of inlet weirs, respectively disposed along two mutually opposite inner surfaces of the chamber, a first of said inlet weirs adapted for fluid communication with said inlet and thus in fluid communication with said injection line and said inlet fluid;
    immiscible fluid weirs extending diametrically across an interior of said chamber so as to bifurcate a cross-section of said chamber, supported within the chamber by first mount means, spaced from the inlet weir means;
    an inclined trough comprising part of said immiscible fluid weirs, for collecting the immiscible fluid and allowing the immiscible fluid which flows over the immiscible fluid weirs to flow out of the chamber through an immiscible fluid outlet; and
    a cleaned water outlet generally at the bottom of the chamber;
    wherein when the inlet fluid is injected into the chamber and into the first inlet weir, the inlet fluid passes over the first inlet weir, the cleaned water flows downwardly toward the bottom of the chamber and through the cleaned water outlet; and
    wherein a mixture of the immiscible fluid and the gas microbubbles floats through the chamber to pass over the immiscible fluid weirs and down the trough to the immiscible fluid outlet.

2. The water treatment vessel as claimed in claim 1, wherein said immiscible fluid weirs are disposed in a position in said chamber spaced apart from and above said inlet weirs.

3. The water treatment vessel as claimed in claim 2, wherein said mixture of immiscible fluid and gas microbubbles floats upwardly in the chamber from said inlet weir to pass over the immiscible fluid weirs.

4. The water treatment vessel as claimed in claim 1 wherein the inlet weirs comprise a base portion and a peripheral wall portion, the peripheral wall portion generally angled upwardly and outwardly from the base portion, for directing the inlet fluid upwardly and away from the inlet weirs.

5. The water treatment vessel as claimed in claim 1 wherein the immiscible fluid weirs comprise a wall portion, said wall portion being mounted on an interior surface of the water treatment vessel and generally angled upwardly and inwardly from the interior surface.

6. The water treatment vessel as claimed in claim 1,
    wherein said immiscible fluid weir means comprises a pair of mutually parallel but spaced-apart substantially vertical immiscible fluid weir members, said trough formed intermediate said immiscible fluid weir members; and
    wherein said pair of inlet weirs comprises a pair of substantially vertical inlet fluid weir members disposed on respectively mutually opposite sides of said chamber, each inlet fluid weir member disposed parallel to but spaced apart from a respective one of said pair of immiscible fluid weir members.

7. The water treatment vessel as claimed in claim 1 wherein the inlet weirs each comprise a peripheral wall portion, the peripheral wall portion generally angled upwardly and inwardly from an interior surface of the chamber, for directing the inlet fluid upwardly and away from the inlet.

8. The water treatment vessel as claimed in claim 1, further having a dividing wall, said wall dividing said chamber into a first volume and a generally equal second volume.

9. The water treatment vessel as claimed in claim 8, wherein a clean water outlet is situated at a bottom of said first volume, and is in fluid communication with and is adapted to inject fluid from said first volume into an inlet weir associated with said second volume.

10. The water treatment vessel as claimed in claim 1, further having four mutually intersecting, vertical, dividing walls dividing said chamber into first, second, third, and fourth volumes, each of said first, second, third and fourth volumes having an associated first, second, third and fourth inlet weir and an associated first, second, third, and fourth water outlet means proximate a base of said vessel, said first inlet weir in fluid communication with said fluid inlet, further having:

first piping means fluidly connecting said first water outlet to said second inlet weir;

second piping means fluidly connecting said second water outlet means to said third inlet weir; and third piping means fluidly connecting said third water outlet means to said fourth inlet weir.

11. The water treatment vessel as claimed in claim 1, wherein said immiscible fluid weir means comprises a pair of parallel, substantially vertical immiscible fluid weirs.

12. A water treatment vessel for removing immiscible fluid from contaminated water to produce cleaned water, comprising:

an injection line in fluid communication with an inlet to the vessel, the injection line for containing and transmitting the contaminated water from a source to the vessel;

bubble generation means in fluid communication with the injection line for injecting gas microbubbles into the injection line and allowing mixing in the injection line of the gas microbubbles and the contaminated water to form an inlet fluid;

inlet weir means comprising first and second inlet weirs, respectively disposed along a portion of two respective mutually opposite inner surfaces of the vessel, said first inlet weir adapted for fluid communication with said inlet and thus in fluid communication with said injection line and said inlet fluid;

a pair of parallel substantially vertical immiscible fluid weirs extending diametrically across an interior of said vessel proximate an upper region thereof and supported within the vessel by first mount means, spaced from the inlet weir means and bounded along a bottom region thereof by an inclined member which together with said vertical immiscible fluid weirs forms a trough for collecting the immiscible fluid;

an immiscible fluid outlet in communication with said trough which allows the immiscible fluid which flows over the immiscible fluid weirs to flow out of the vessel; and a cleaned water outlet at the bottom of the vessel;

wherein a mixture of the immiscible fluid and the gas microbubbles rises within the vessel and passes over the immiscible fluid weirs and down the trough to the immiscible fluid outlet; and clean water remains in the bottom of the vessel and passes from the vessel via the cleaned water outlet.

13. The water treatment vessel as claimed in claim 12 or 11 wherein said substantially vertical immiscible fluid weirs are situated parallel to, and intermediate said inlet weirs.

* * * * *